(12) United States Patent
Yamamoto

(10) Patent No.: US 8,768,551 B2
(45) Date of Patent: Jul. 1, 2014

(54) VEHICLE DRIVING APPARATUS

(75) Inventor: Akihiro Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 13/450,006

(22) Filed: Apr. 18, 2012

(65) Prior Publication Data
US 2012/0271496 A1 Oct. 25, 2012

(30) Foreign Application Priority Data

Apr. 19, 2011 (JP) ................................. 2011-093006
Apr. 19, 2011 (JP) ................................. 2011-093007

(51) Int. Cl.
| | | |
|---|---|---|
| *B60L 15/00* | (2006.01) | |
| *B60K 7/00* | (2006.01) | |
| *B60K 17/04* | (2006.01) | |
| *B60K 17/356* | (2006.01) | |
| *B60L 11/14* | (2006.01) | |
| *B60L 11/12* | (2006.01) | |

(52) U.S. Cl.
CPC ............. *B60K 7/0007* (2013.01); *B60K 17/043* (2013.01); *B60K 17/356* (2013.01); *B60L 11/14* (2013.01); *B60L 11/123* (2013.01); *B60K 2007/0046* (2013.01); *Y02T 10/7077* (2013.01); *B60K 2001/0006* (2013.01)
USPC ........................................ 701/22; 180/65.265

(58) Field of Classification Search
CPC .... B60K 7/007; B60K 17/043; B60K 17/356; B60K 2007/0046; B60K 2001/006; B60K 2007/0092; B60L 11/14; B60L 11/123
USPC ................ 701/22, 50; 180/65.265, 6.28, 243, 180/65.225, 65.6, 65.285, 69.6, 62, 6.24; 290/4 R, 9, 14; 303/151, 152; 903/902; 477/3
See application file for complete search history.

(56) References Cited

U.S. PATENT DOCUMENTS

| | | | |
|---|---|---|---|
| 5,481,460 A * | 1/1996 | Masaki et al. ................... 701/50 |
| 6,024,182 A * | 2/2000 | Hamada et al. .............. 180/6.28 |
| 6,105,704 A * | 8/2000 | Hamada et al. .............. 180/248 |
| 6,325,735 B1 * | 12/2001 | Kanehira et al. .............. 474/212 |
| 2006/0196714 A1* | 9/2006 | Sugimoto et al. ............. 180/242 |
| 2007/0249456 A1 | 10/2007 | Meixner |
| 2009/0036246 A1* | 2/2009 | Bucknor et al. ................... 475/5 |
| 2009/0088914 A1* | 4/2009 | Mizutani et al. ................ 701/22 |
| 2009/0118882 A1* | 5/2009 | Heap et al. ...................... 701/22 |

FOREIGN PATENT DOCUMENTS

| | | |
|---|---|---|
| JP | 9-79348 A | 3/1997 |
| JP | 2000-318473 A | 11/2000 |
| JP | 2000-318474 A | 11/2000 |
| JP | 2000-324612 A | 11/2000 |
| JP | 2000-324767 A | 11/2000 |

(Continued)

*Primary Examiner* — Marthe Marc-Coleman
(74) *Attorney, Agent, or Firm* — Arent Fox LLP

(57) ABSTRACT

A rear wheel driving apparatus includes: a left wheel driving device having a motor for driving a left rear wheel, and a planetary gear decelerator; a right wheel driving device having a motor for driving a right rear wheel, and a planetary gear decelerator; and a control device for controlling the motors. The motors are connected to sun gears of the planetary gear decelerators, respectively, the left rear wheel and right rear wheel are connected to the planetary carriers, respectively, and the ring gears are connected to each other. The control device performs driving control on only one of the motors to control the rotations of ring gears.

20 Claims, 31 Drawing Sheets

(56) References Cited

FOREIGN PATENT DOCUMENTS

| | | |
|---|---|---|
| JP | 2001-001779 A | 1/2001 |
| JP | 2001-004723 A | 1/2001 |
| JP | 2004-248498 A | 9/2004 |
| JP | 2007-313982 A | 12/2007 |
| JP | 2010-119204 A | 5/2010 |
| JP | 2010-200426 A | 9/2010 |
| JP | 2010-235051 A | 10/2010 |
| JP | 2011-031742 A | 2/2011 |
| WO | WO 2011/013829 A1 | 2/2011 |

* cited by examiner

FIG. 13

| VEHICLE CONDITION | FRONT UNIT | REAR UNIT | REAR MOTOR | EOP | SOL | OWC | BRK |
|---|---|---|---|---|---|---|---|
| STOP | × | × | STOP | OFF | OFF | OFF | OFF |
| FORWARD MOVEMENT AT LOW SPEED | × | ○ | POWER DRIVING | Lo | OFF | ON | ON (SLIGHTLY ENGAGED) |
| FORWARD MOVEMENT AT INTERMEDIATE SPEED | ○ | × | STOP | Lo | OFF | OFF | ON (SLIGHTLY ENGAGED) |
| DECELERATION REGENERATION | ○ | ○ | REGENERATION DRIVING | Hi | OFF | OFF | ON |
| ACCELERATION | ○ | ○ | POWER DRIVING | Lo | OFF | ON | ON (SLIGHTLY ENGAGED) |
| FORWARD MOVEMENT AT HIGH SPEED | ○ | × | STOP | Lo | ON | OFF | OFF |
| BACKWARD MOVEMENT | × | ○ | REVERSE POWER DRIVING | Hi | OFF | OFF | ON |

FORWARD MOVEMENT AT INTERMEDIATE SPEED

VEHICLE DRIVING APPARATUS

This application claims priority from Japanese Patent Applications No. 2011-093006, filed on Apr. 19, 2011, No. 2011-093007, filed on Apr. 19, 2011, the entire contents of which are herein incorporated by reference.

BACKGROUND

1. Technical Field

The present invention relates to a vehicle driving apparatus in which a driving device for driving a left wheel and a driving device for driving a right wheel are separately provided.

2. Related Art

WO 2011/013829 and Japanese Unexamined Patent Application Publication No. 9-79348 each disclose a vehicle driving apparatus including: a left wheel driving device having a first motor for driving a left wheel of a vehicle, and a first planetary gear transmission provided on a power transmission path between the first motor and the left wheel; and a right wheel driving device having a second motor for driving a right wheel of the vehicle, and a second planetary gear transmission provided on a power transmission path between the second motor and the right wheel. The first and second motors are connected to sun gears of the first and second planetary gear transmissions, respectively, the left wheel and right wheel are connected to planetary carriers of the first and second planetary gear transmissions, respectively, and ring gears of the first and second planetary gear transmissions are connected to each other. Further, the vehicle driving apparatus is provided with: a hydraulic brake that is released or engaged, thereby braking rotations of the connected ring gears; and a one-way clutch which is provided in parallel with the hydraulic brake and through which the rotations of the ring gears in one direction are allowed and the rotations of the ring gears in the reverse direction are restricted.

In the apparatus disclosed in WO 2011/013829, when forward rotation power from the motors is inputted to the wheels to move the vehicle forward, the one-way clutch is engaged, thereby allowing the rotational power from the motors to be transmitted to the wheels. On the other hand, when forward rotation power from the wheels is inputted to the motors, the one-way clutch enters a non-engaged state, thereby preventing the power from the wheels from being transmitted to the motors. Furthermore, when regeneration is carried out by the motors by using the rotational power from the wheels, the hydraulic brake is engaged, thereby transmitting the rotational power from the wheels to the motors.

In the apparatus disclosed in WO 2011/013829, in controlling rotational frequencies of the ring gears to change a connection/disconnection means from a released state to an engaged state when the forward rotation power from the wheels is inputted to the motors, driving control is performed on both of the left and right motors, i.e., the first and second motors, so that target rotational frequencies are achieved.

Referring to FIGS. 27A to 27D and FIG. 28, the above-described control will be specifically described using an example in which the vehicle is making a turn (left turn). When the vehicle makes a left turn by front wheel driving carried out by a front wheel driving apparatus, a rotation difference occurs between right and left rear wheels, so that the motor for driving the left rear wheel is rotated in the reverse direction and the motor for driving the right rear wheel is rotated in the normal direction (FIG. 27 A). In this state, when hydraulic brake engagement requirements are satisfied based on a vehicle speed, a steering angle, etc., first, both of the motors are driven so that rotational frequencies of both of the motors become target rotational frequencies (FIG. 27B). The rotational frequencies of both of the motors are brought close to the target rotational frequencies, thus reducing the rotational frequencies of the ring gears and completing rotation adjustment. At this point, the hydraulic brake is engaged, thus fixing the ring gears (FIG. 27C). Then, regeneration is performed by the motor for the left rear wheel serving as an inner wheel at the time of left turning, and the motor for the right rear wheel serving as an outer wheel at the time of left turning is driven (FIG. 27D). Thus, at the time of turning of the vehicle, regeneration can be performed by one of the motors by utilizing a rotation difference between the right and left wheels, and a counterclockwise yawing moment indicated by the hatched arrow in FIG. 27D is exerted on the vehicle.

However, in the control disclosed in WO 2011/013829, the two motors, i.e., the motor for driving the left rear wheel and the motor for driving the right rear wheel, are objects to be controlled, and the rotational frequencies of the motors are different, thus causing a problem that the control is complicated. Further, since both of the motors are driven, there is room for improvement in terms of energy consumption. Moreover, while the rotational frequencies of the ring gears are reduced in order to engage the hydraulic brake, i.e., during a period between a time at which the hydraulic brake engagement requirements are satisfied and a time at which rotation adjustment is completed, no yawing moment is generated as illustrated in FIG. 28.

Furthermore, in the technique disclosed in Japanese Unexamined Patent Application Publication No. 9-79348, when the vehicle is making a turn, the motor for an outer wheel is controlled so as to be driven in the normal (forward) direction and the motor for an inner wheel is controlled so as to be driven in the reverse (opposite) direction, thereby generating a yawing moment in the turning direction and assisting the vehicle in making the turn.

In the vehicle driving apparatus disclosed in Japanese Unexamined Patent Application Publication No. 9-79348, driving control is performed on both of the motors in assisting the vehicle to make a turn. Accordingly, the two motors, i.e., the motor for driving an outer wheel and the motor for driving an inner wheel, are objects to be controlled, and the rotational frequencies of the motors are different, thus causing a problem that the control is complicated. Further, since both of the motors are driven, there is room for improvement in terms of energy consumption.

SUMMARY OF THE INVENTION

One or more illustrative aspects of the present invention are to provide a vehicle driving apparatus capable of generating a yawing moment with a simple control.

According to a first aspect of the present invention, there is provided a vehicle driving apparatus (e.g., a rear wheel driving apparatus 1 in an embodiment described later). The apparatus comprises: a left wheel driving device comprising: a first motor (e.g., a motor 2A in the embodiment described later) that drives a left wheel (e.g., a left rear wheel LWr in the embodiment described later) of a vehicle; and a first transmission device (e.g., a planetary gear decelerator 12A in the embodiment described later) disposed on a power transmission path between the first motor and the left wheel; a right wheel driving device comprising: a second motor (e.g., a motor 2B in the embodiment described later) that drives a right wheel (e.g., a right rear wheel RWr in the embodiment described later) of the vehicle; and a second transmission device (e.g., a planetary gear decelerator 12B in the embodiment described later) disposed on a power transmission path between the second motor and the right wheel; and a motor controller (e.g., a control device 8 in the embodiment described later) that controls the first and second motors. Each of the first and second transmission devices comprises first to third rotation elements. The first motor is connected to the first rotation element (e.g., a sun gear 21A) of the first transmission device, and the second motor is connected to the first rotation element (e.g., a sun gear 21B) of the second transmission device. The left wheel is connected to the second rotation element (e.g., a planetary carrier 23A) of the first transmission device, and the right wheel is connected to the second rotation element (e.g., a planetary carrier 23B) of the second transmission device. The third rotation element (e.g., a ring gear 24A in the embodiment described later) of the first transmission device and the third rotation element (e.g., a ring gear 24B in the embodiment described later) of the second transmission device are connected to each other. When the motor controller controls the third rotation elements connected to each other such that rotations of the third rotation elements reach a targeted value, the motor controller performs driving control on only one of the first and second motors so as to control the rotations of the third rotations elements.

A second aspect of the present invention, the motor controller selects either one of the first and second motors based on a target yawing moment, and performs the driving control on the selected motor.

A third aspect of the present invention, the motor controller selects either one of the first and second motors such that a yawing moment is generated in the same direction as that of the target yawing moment.

A fourth aspect of the present invention, the motor controller selects either one of the first an second motors which drives an outer wheel when the vehicle is turning, and performs the driving control on the selected motor.

A fifth aspect of the present invention, the apparatus further comprises: a brake (e.g., hydraulic brakes 60A and 60B in the embodiment described later) that brakes the rotations of the third rotation elements. The motor controller performs driving control on either one of the first and second motors such that a yawing moment is generated in the same direction as that of a yawing moment generated when the brake brakes the rotations of the third rotation elements.

A sixth aspect of the present invention, the apparatus further comprises: a one-way rotation restrictor (e.g., a one-way clutch 50 in the embodiment described later) which allows the rotations of the third rotation elements in one direction and which restricts the rotations of the third rotation elements in the other direction opposite to said one direction. The motor controller performs the driving control on either one of the first and second motors such that a yawing moment is generated in the same direction as that of a yawing moment generated when the one-way rotation restrictor restricts the rotations of the third rotation elements.

According to a seventh aspect of the present invention, there is provided a vehicle driving apparatus (e.g., the rear wheel driving apparatus 1 in the embodiment described later). The apparatus comprises: a left wheel driving device comprising: a first motor (e.g., the motor 2A in the embodiment described later) that drives a left wheel (e.g., the left rear wheel LWr in the embodiment described later) of a vehicle; and a first transmission device (e.g., the planetary gear decelerator 12A in the embodiment described later) disposed on a power transmission path between the first motor and the left wheel; a right wheel driving device comprising: a second motor (e.g., the motor 2B in the embodiment described later) that drives a right wheel (e.g., the right rear wheel RWr in the embodiment described later) of the vehicle; and a second transmission device (e.g., the planetary gear decelerator 12B in the embodiment described later) disposed on a power transmission path between the second motor and the right wheel; and a motor controller (e.g., the control device 8 in the embodiment described later) that controls the first and second motors. Each of the first and second transmission devices comprises first to third rotation elements. The first motor is connected to the first rotation element (e.g., the sun gear 21A in the embodiment described later) of the first transmission device, and the second motor is connected to the first rotation element (e.g., the sun gear 21B in the embodiment described later) of the second transmission device. The left wheel is connected to the second rotation element (e.g., the planetary carrier 23A in the embodiment described later) of the first transmission device, and the right wheel is connected to the second rotation element (e.g., the planetary carrier 23B in the embodiment described later) of the second transmission device. The third rotation element (e.g., the ring gear 24A in the embodiment described later) of the first transmission device and the third rotation element (e.g., the ring gear 24B in the embodiment described later) of the second transmission device are connected to each other. When the motor controller controls the third rotation elements connected to each other such that rotations of the third rotation elements reach a targeted value, the motor controller selectively performs either one of unilateral rotational frequency control (e.g., a 1 MOT rotational frequency adjusting process in the embodiment described later) and bilateral rotational frequency control (e.g., a 2 MOT rotational frequency adjusting process in the embodiment described later). The motor controller performs driving control on either one of the first and second motors so as to control the rotation of said either one of the first and second motors in the unilateral rotational frequency control. The motor controller performs driving control on both of the first and second motors so as to control the rotations of said both of the first and second motors in the bilateral rotational frequency control.

An eighth aspect of the present invention, the motor controller performs the unilateral rotational frequency control when the vehicle is turning, and performs the bilateral rotational frequency control when the vehicle is moving straight.

A ninth aspect of the present invention, the motor controller performs the bilateral rotational frequency control when the vehicle is turning and longitudinal acceleration is equal to or higher than a given value, and performs the unilateral rotational frequency control when the vehicle is turning and the longitudinal acceleration is lower than the given value.

A tenth aspect of the present invention, in the unilateral rotational frequency control, the motor controller selects either one of the first and second motors based on a target yawing moment, and performs the driving control on the selected motor.

An eleventh aspect of the present invention, in the unilateral rotational frequency control, the motor controller selects either one of the first and second motors such that a yawing moment is generated in the same direction as that of the target yawing moment.

A twelfth aspect of the present invention, in the unilateral rotational frequency control, the motor controller selects either one of the first an second motors which drives an outer wheel when the vehicle is turning, and performs the driving control on the selected motor.

A thirteenth aspect of the present invention, the apparatus further comprises: a brake (e.g., the hydraulic brakes 60A and 60B in the embodiment described later) that brakes the rotations of the third rotation elements. In the unilateral rotational frequency control, the motor controller performs the driving control on either one of the first and second motors such that a yawing moment is generated in the same direction as that of a yawing moment generated when the brake brakes the rotations of the third rotation elements.

A fourteenth aspect of the present invention, the apparatus further comprises: a one-way rotation restrictor (e.g., the one-way clutch 50 in the embodiment described later) which allows the rotations of the third rotation elements in one direction and which restricts the rotations of the third rotation elements in the other direction opposite to said one direction. In the unilateral rotational frequency control, the motor controller performs the driving control on either one of the first and second motors such that a yawing moment is generated in the same direction as that of a yawing moment generated when the one-way rotation restrictor restricts the rotations of the third rotation elements.

A fifteenth aspect of the present invention, there is provided a vehicle driving apparatus (e.g., a rear wheel driving apparatus 1 in an embodiment described later). The apparatus comprises: a left wheel driving device comprising: a first motor (e.g., a motor 2A in the embodiment described later) that drives a left wheel (e.g., a left rear wheel LWr in the embodiment described later) of a vehicle; and a first transmission device (e.g., a planetary gear decelerator 12A in the embodiment described later) disposed on a power transmission path between the first motor and the left wheel; a right wheel driving device comprising: a second motor (e.g., a motor 2B in the embodiment described later) that drives a right wheel (e.g., a right rear wheel RWr in the embodiment described later) of the vehicle; and a second transmission device (e.g., a planetary gear decelerator 12B in the embodiment described later) disposed on a power transmission path between the second motor and the right wheel; and a motor controller (e.g., a control device 8 in the embodiment described later) that controls the first and second motors. Each of the first and second transmission devices comprises first to third rotation elements. The first motor is connected to the first rotation element (e.g., a sun gear 21A) of the first transmission device, and the second motor is connected to the first rotation element (e.g., a sun gear 21B) of the second transmission device. The left wheel is connected to the second rotation element (e.g., a planetary carrier 23A) of the first transmission device, and the right wheel is connected to the second rotation element (e.g., a planetary carrier 23B) of the second transmission device. The third rotation element (e.g., a ring gear 24A in the embodiment described later) of the first transmission device and the third rotation element (e.g., a ring gear 24B in the embodiment described later) of the second transmission device are connected to each other. The motor controller performs driving control on either one of the first and second motors so as to control a turning state amount of the vehicle.

A sixteenth aspect of the present invention, the apparatus further comprises: a brake (e.g., the hydraulic brakes 60A and 60B in the embodiment described later) that brakes the rotations of the third rotation elements. When the brakes releases the rotations of the third rotation elements, the motor controller performs the driving control on either one of the first and second motors so as to control the turning state amount of the vehicle.

A seventeenth aspect of the present invention, the apparatus further comprises: a one-way rotation restrictor (e.g., the one-way clutch 50 in the embodiment described later) which allows the rotations of the third rotation elements in one direction and which restricts the rotations of the third rotation elements in the other direction opposite to said one direction. The motor controller performs the driving control on either one of the first and second motors so as to control the turning state amount of the vehicle, when the one-way rotation restrictor releases the rotations of the third rotation elements.

An eighteenth aspect of the present invention, the motor controller selects either one of the first and second motors based on a target turning state amount or a required turning state amount, and performs the driving control on the selected motor.

A nineteenth aspect of the present invention, the motor controller selects either one of the first and second motors such that the turning state amount of the vehicle is in the same direction as that of the target turning state amount or the required turning state amount.

A twentieth aspect of the present invention, a yawing moment is used as the turning state amount of the vehicle.

According to the first aspect of the present invention, generation of a yawing moment is enabled when the rotations of the third rotation elements are controlled. Further, as compared with a case where driving control is performed on both of the first and second motors, the number of objects to be controlled is reduced, thus enhancing controllability and enabling a reduction in energy consumption.

According to the second aspect of the present invention, a yawing moment can be suitably generated, and operability of the vehicle at the time of turning can be enhanced.

According to the third aspect of the present invention, it is possible to assist the vehicle in making a turn, to correct a disturbed behavior of the vehicle, and to enhance the operability of the vehicle at the time of turning.

According to the fourth aspect of the present invention, it is possible to assist the vehicle in making a turn, and to enhance the operability of the vehicle at the time of turning.

According to the fifth aspect of the present invention, the vehicle driving apparatus includes the connection/disconnection means for braking the rotations of the third rotation elements, thus making it possible to disconnect the motors when neither driving nor regeneration of the motors is necessary, and to reduce losses caused by drag of the motors. Furthermore, the motor is selected so that a yawing moment is generated in the same direction as that of a yawing moment generated after the engagement of the connection/disconnection means, thus making it possible to reduce a difference between the yawing moment generated during the rotation control and the yawing moment generated after the engagement of the connection/disconnection means.

According to the sixth aspect of the present invention, the vehicle driving apparatus includes the one-way rotation restrictor for allowing the rotations of the third rotation elements in one direction and for restricting the rotations of the third rotation elements in the reverse direction, thus allowing switching between disconnection and connection of the motors in a mechanical manner. Further, the motor is selected so that a yawing moment is generated in the same direction as that of a yawing moment generated after the engagement of the one-way rotation restrictor, thus making it possible to reduce a difference between the yawing moment generated during the rotation control and the yawing moment generated after the engagement of the one-way rotation restrictor.

According to the seventh aspect of the present invention, in the unilateral rotational frequency control, the rotational frequency control can be performed with low energy consumption, and furthermore, generation of a yawing moment is enabled. Moreover, in the bilateral rotational frequency control, the rotational frequency control can be performed at an early stage. The unilateral rotational frequency control or the bilateral rotational frequency control is suitably selected in accordance with a traveling state of the vehicle, thus making it possible to achieve both of enhancement in traveling performance of the vehicle and reduction in energy consumption.

According to the eighth aspect of the present invention, the unilateral rotational frequency control is performed at the time of turning, thereby enabling enhancement in operability of the vehicle at the time of turning.

According to the ninth aspect of the present invention, when the vehicle is making a turn and performs rapid deceleration, the rotation control is performed at an early stage by the bilateral rotational frequency control, thereby enabling an increase in regeneration amount.

According to the tenth or eleventh aspect of the present invention, a yawing moment can be suitably generated.

According to the twelfth aspect of the present invention, the operability of the vehicle at the time of turning can be enhanced.

According to the thirteenth aspect of the present invention, the vehicle driving apparatus includes the connection/disconnection means for braking the rotations of the third rotation elements, thus making it possible to disconnect the motors when neither driving nor regeneration of the motors is necessary, and to reduce losses caused by drag of the motors. Furthermore, the motor is selected so that a yawing moment is generated in the same direction as that of a yawing moment generated after the engagement of the connection/disconnection means, thus making it possible to reduce a difference between the yawing moment generated during the rotation control and the yawing moment generated after the engagement of the connection/disconnection means.

According to the fourteenth aspect of the present invention, the vehicle driving apparatus includes the one-way rotation restrictor for allowing the rotations of the third rotation elements in one direction and for restricting the rotations of the third rotation elements in the reverse direction, thus allowing disconnection of the motors in a mechanical manner. Further, the motor is selected so that a yawing moment is generated in the same direction as that of a yawing moment generated after the engagement of the one-way rotation restrictor, thus making it possible to reduce a difference between the yawing moment generated during the rotation control and the yawing moment generated after the engagement of the one-way rotation restrictor.

According to the fifteenth aspect of the present invention, the turning state amount of the vehicle is controlled by performing driving control on only one of the first and second motors, thus making it possible to assist the vehicle in making a turn, and to correct a disturbed behavior of the vehicle. Further, driving control is performed on only one of the first and second motors; thus, as compared with the case where driving control is performed on both of the first and second motors, the number of objects to be controlled is reduced, thereby enhancing controllability and enabling a reduction in energy consumption.

According to the sixteenth aspect of the present invention, in a case where driving control is performed on only one of the first and second motors when the connection/disconnection means is released, it is impossible to transmit a driving force of the motor to the wheel without loss; however, since the driving force is partially transmittable, it is possible to instantaneously control the turning state amount of the vehicle without performing rotation adjustment incident to the engagement of the connection/disconnection means.

According to the seventeenth aspect of the present invention, in a case where driving control is performed on only one of the first and second motors when the one-way rotation restrictor is not engaged, it is impossible to transmit the driving force of the motor to the wheel without loss; however, since the driving force is partially transmittable, it is possible to instantaneously control the turning state amount of the vehicle without performing rotation adjustment incident to the engagement of the one-way rotation restrictor.

According to the eighteenth aspect of the present invention, the turning state amount can be suitably controlled, and the operability of the vehicle at the time of turning can be enhanced.

According to the nineteenth aspect of the present invention, it is possible to assist the vehicle in making a turn, to correct a disturbed behavior of the vehicle, and to enhance the operability of the vehicle at the time of turning.

According to the twentieth aspect of the present invention, a yawing moment is used as the turning state amount of the vehicle, thus making it possible to control the vehicle at the time of turning and correct a behavior of the vehicle with high accuracy.

BRIEF DESCRIPTION OF THE DRAWINGS

FIG. 13 is a table illustrating a relationship between a front wheel driving apparatus and a rear wheel driving apparatus with respect to each vehicle state, together with operating states of motors and a state of a hydraulic circuit;

DETAILED DESCRIPTION

First, a vehicle driving apparatus according to the present invention will be described with reference to FIGS. 1 to 4.

Figure 1:
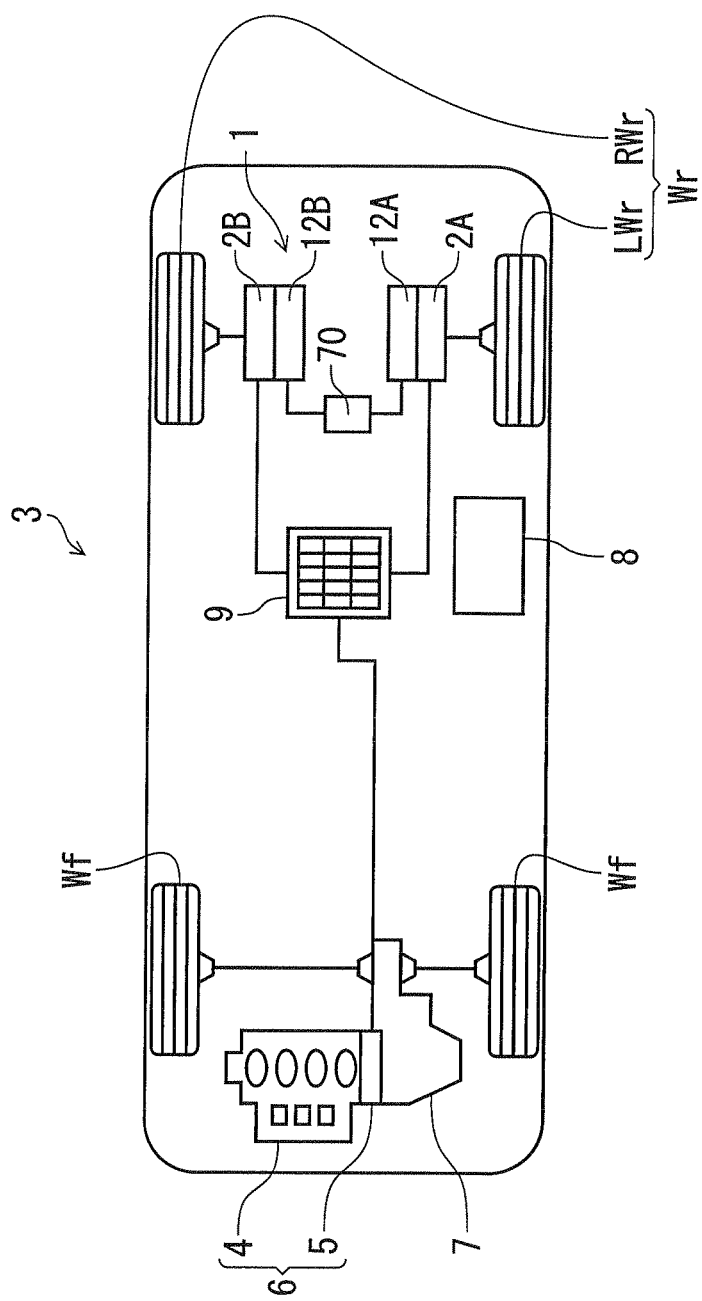
FIG. 1 is a block diagram illustrating a schematic configuration of a hybrid vehicle including a vehicle driving apparatus according to the present invention.

The vehicle driving apparatus according to the present invention utilizes a motor as a driving source for driving a vehicle axle, and is used for a vehicle having a driving system such as one illustrated in FIG. 1, for example. The following description will be made on an example in which the vehicle driving apparatus is used for rear wheel driving, but the vehicle driving apparatus may also be used for front wheel driving.

A vehicle 3 illustrated in FIG. 1 is a hybrid vehicle having, at a vehicle front part, a driving apparatus 6 (hereinafter referred to as a "front wheel driving apparatus") in which an internal combustion engine 4 and a motor 5 are connected in series. Power generated by the front wheel driving apparatus 6 is transmitted to front wheels Wf via a transmission 7; on the other hand, power generated by a driving apparatus 1 (hereinafter referred to as a "rear wheel driving apparatus"), provided at a vehicle rear part separately from the front wheel driving apparatus 6, is transmitted to rear wheels Wr (RWr and LWr). The motor 5 of the front wheel driving apparatus 6, and motors 2A and 2B of the rear wheel driving apparatus 1, which are provided for the rear wheels Wr, are connected to a battery 9, thus enabling supply of power from the battery 9 and regeneration of energy to the battery 9. The reference character "8" represents a control device for performing various types of control for the entire vehicle.

Figure 2:
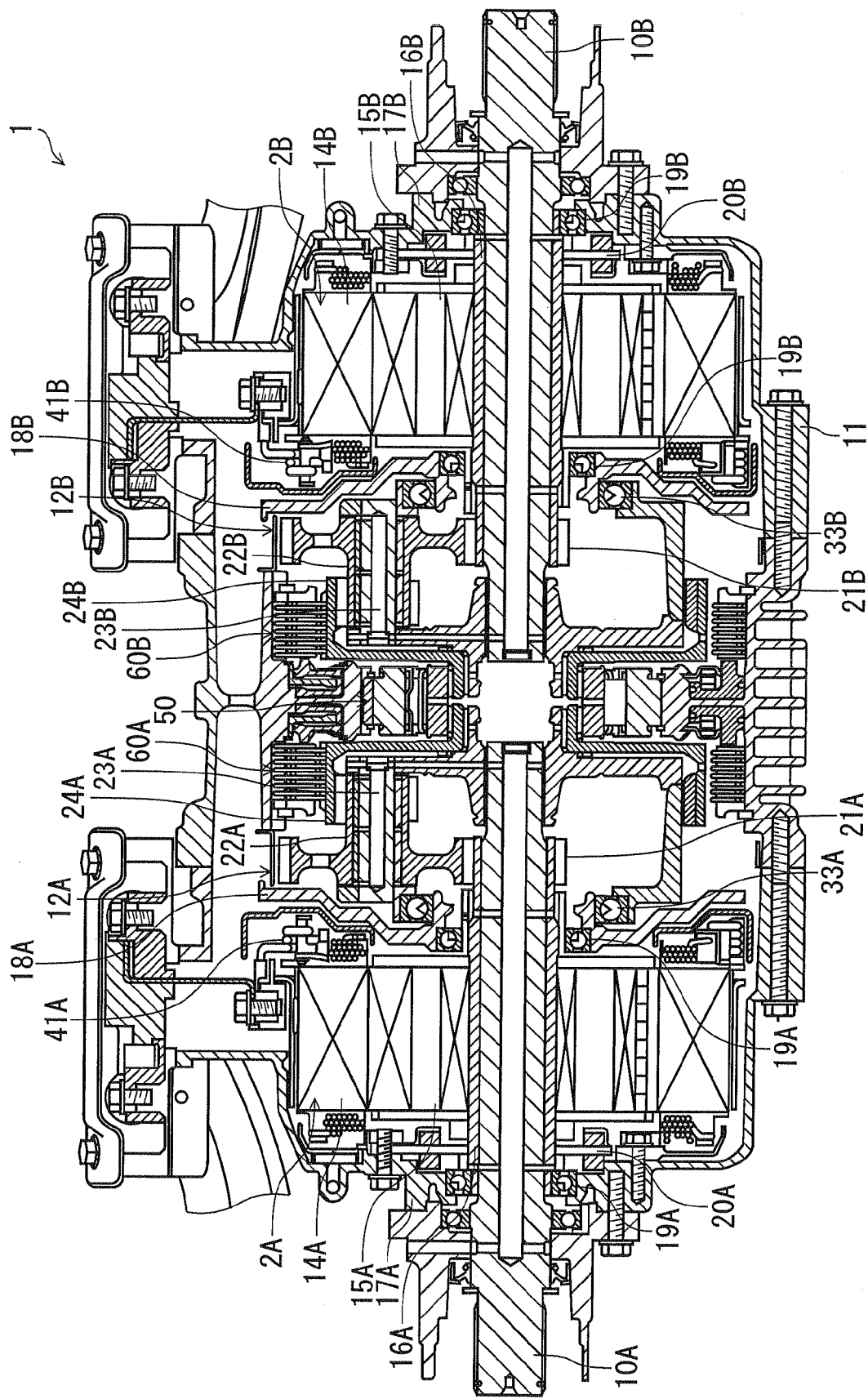
FIG. 2 is a longitudinal cross-sectional view illustrating one embodiment of a rear wheel driving apparatus according to the present invention.
Figure 4:
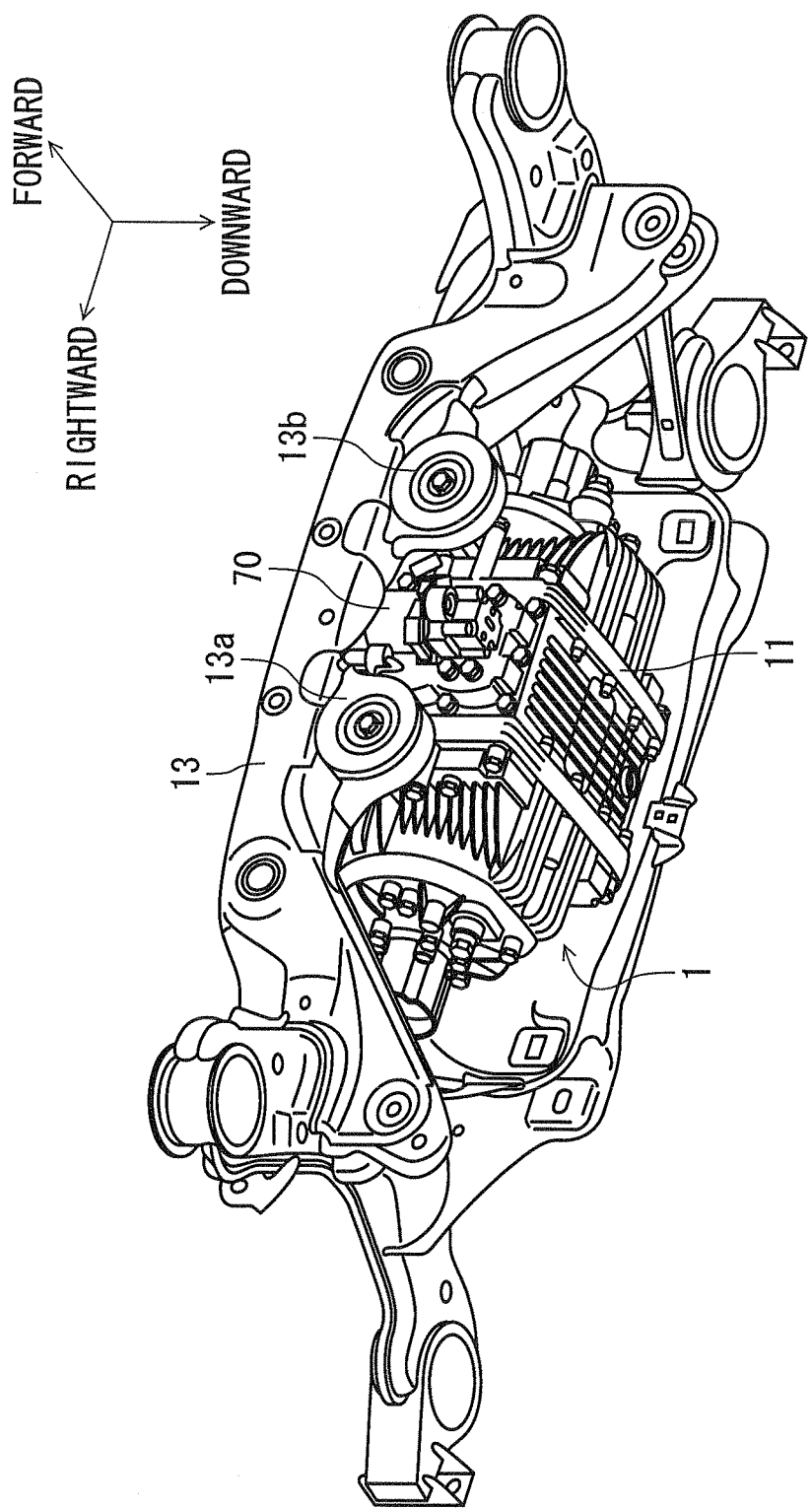
FIG. 4 is a perspective view illustrating a state in which the rear wheel driving apparatus is installed on a frame.

FIG. 2 is a longitudinal cross-sectional view illustrating the entire rear wheel driving apparatus 1. Referring to FIG. 2, the reference characters "10A" and "10B" represent left and right vehicle axles for the rear wheels Wr of the vehicle 3, and the vehicle axles 10A and 10B are located so as to be coaxial with each other in a vehicle width direction. A decelerator case 11 of the rear wheel driving apparatus 1 is formed into an approximately cylindrical shape as a whole. Inside the decelerator case 11, the motors 2A and 2B for vehicle axle driving, and planetary gear decelerators 12A and 12B for decelerating driving rotations of the motors 2A and 2B are located coaxially with the vehicle axles 10A and 10B. The motor 2A and the planetary gear decelerator 12A function as a left wheel driving device for driving the left rear wheel LWr. The motor 2B and the planetary gear decelerator 12B function as a right wheel driving device for driving the right rear wheel RWr. The motor 2A and planetary gear decelerator 12A, and the motor 2B and planetary gear decelerator 12B are located symmetrically along the vehicle width direction inside the decelerator case 11. Further, as illustrated in FIG. 4, the decelerator case 11 is supported by: supporting portions 13a and 13b of a frame member 13 constituting part of a frame serving as an outline of the vehicle 3; and a frame (not illustrated) of the rear wheel driving apparatus 1. The supporting portions 13a and 13b are provided at lateral positions with respect to a center of the frame member 13 in the vehicle width direction. Note that the arrows in FIG. 4 indicate positional relationship in a state where the rear wheel driving apparatus 1 is installed on the vehicle 3.

Stators 14A and 14B of the motors 2A and 2B are fixed inside lateral ends of the decelerator case 11, and annular rotors 15A and 15B are located inwardly of the stators 14A and 14B, respectively, in a rotatable manner. Cylindrical shafts 16A and 16B, surrounding outer peripheries of the vehicle axles 10A and 10B, are connected to inner peripheral portions of the rotors 15A and 15B, respectively, and are supported by end walls 17A and 17B and intermediate walls 18A and 18B of the decelerator case 11 via bearings 19A and 19B so that the cylindrical shafts 16A and 16B are coaxial with the vehicle axles 10A and 10B and relatively rotatable with respect thereto. Further, the end walls 17A and 17B of the decelerator case 11, located adjacent to outer peripheries of the cylindrical shafts 16A and 16B at one ends thereof, are provided with resolvers 20A and 20B for feeding back rotational position information of the rotors 15A and 15B to a controller (not illustrated) for the motors 2A and 2B.

Furthermore, the planetary gear decelerator 12A includes: a sun gear 21A; a plurality of planetary gears 22A intermeshing with the sun gear 21A; a planetary carrier 23A for supporting the planetary gears 22A; and a ring gear 24A intermeshing with outer peripheral portions of the planetary gears 22A, and the planetary gear decelerator 12B includes: a sun gear 21B; a plurality of planetary gears 22B intermeshing with the sun gear 21B; a planetary carrier 23B for supporting the planetary gears 22B; and a ring gear 24B intermeshing with outer peripheral portions of the planetary gears 22B. Driving forces of the motors 2A and 2B are inputted from the sun gears 21A and 21B, and decelerated driving forces are outputted through the planetary carriers 23A and 23B.

Figure 3:
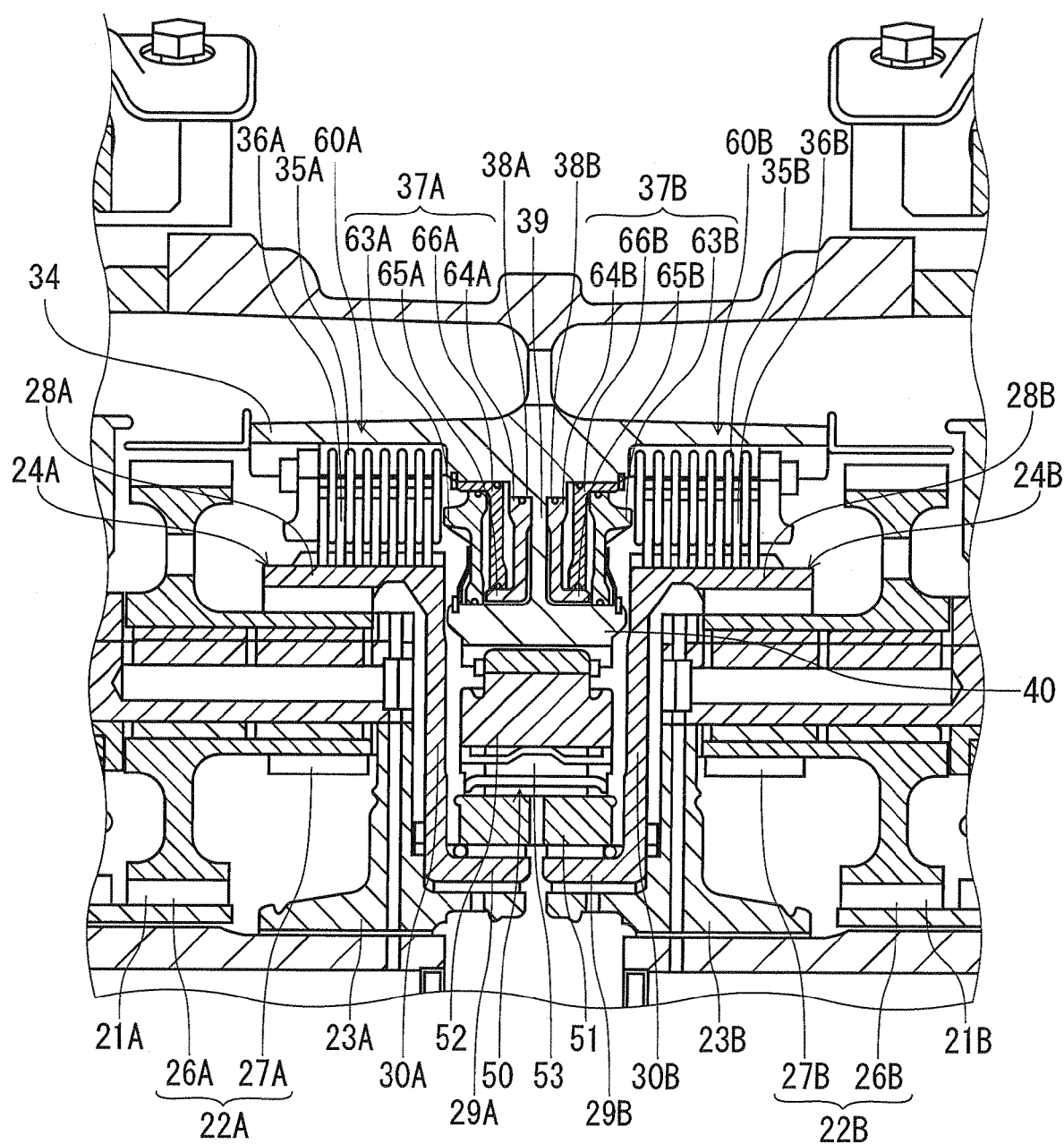
FIG. 3 is an enlarged partial view of the rear wheel driving apparatus illustrated in FIG. 2.

The sun gears 21A and 21B are formed integrally with the cylindrical shafts 16A and 16B, respectively. Moreover, as illustrated in FIG. 3, for example, the planetary gears 22A and 22B are double pinions having: first pinions 26A and 26B having large diameters and directly intermeshing with the sun gears 21A and 21B; and second pinions 27A and 27B having diameters smaller than those of the first pinions 26A and 26B. The first pinions 26A and 26B and the second pinions 27A and 27B are integrally formed so as to be coaxial with each other and axially offset from each other. The planetary gears 22A and 22B are supported by the planetary carriers 23A and 23B, respectively. Axial inner ends of the planetary carriers 23A and 23B are extended radially inward and spline-fitted to the vehicle axles 10A and 10B, respectively, so that the planetary carriers 23A and 23B are supported so as to be rotated integrally therewith, and are supported by the intermediate walls 18A and 18B via bearings 33A and 33B, respectively.

Note that the intermediate walls 18A and 18B are formed by being bent so that motor containing spaces for containing the motors 2A and 2B and decelerator spaces for containing the planetary gear decelerators 12A and 12B are separated by the intermediate walls 18A and 18B, and a mutual axial spacing therebetween is increased from outer diameter regions of the intermediate walls 18A and 18B to inner diameter regions thereof. Further, the bearings 33A and 33B for supporting the planetary carriers 23A and 23B are located adjacent to the inner diameter regions of the intermediate walls 18A and 18B and adjacent to the planetary gear decelerators 12A and 12B, respectively, and bus rings 41A and 41B for the stators 14A and 14B are located adjacent to the outer diameter regions of the intermediate walls 18A and 18B and adjacent to the motors 2A and 2B, respectively (see FIG. 2).

The ring gears 24A and 24B are formed to include: gear portions 28A and 28B whose inner peripheral surfaces intermesh with the small diameter second pinions 27A and 27B; small diameter portions 29A and 29B having diameters smaller than those of the gear portions 28A and 28B and located at intermediate positions in the decelerator case 11 so as to face each other; and connection portions 30A and 30B through which axial inner ends of the gear portions 28A and 28B and axial outer ends of the small diameter portions 29A and 29B are connected to each other in a radial direction. In this embodiment, maximum diameters of the ring gears 24A and 24B are smaller than maximum distances of the first pinions 26A and 26B from centers of the vehicle axles 10A and 10B, respectively. The small diameter portions 29A and 29B are each spline-fitted to an inner race 51 of a one-way clutch 50 described later, and the ring gears 24A and 24B are formed so as to be rotated integrally with the inner race 51 of the one-way clutch 50.

Actually, a cylindrical space is ensured between the decelerator case 11 and the ring gears 24A and 24B. Inside the cylindrical space, hydraulic brakes 60A and 60B constituting braking means for the ring gears 24A and 24B are located so as to be radially lapped over the first pinions 26A and 26B and axially lapped over the second pinions 27A and 27B. In the hydraulic brakes 60A and 60B, a plurality of fixation plates 35A and 35B are spline-fitted to an inner peripheral surface of a tubular outer diameter side supporting portion 34 extended axially along an inner diameter side region of the decelerator case 11, and a plurality of rotation plates 36A and 36B are spline-fitted to outer peripheral surfaces of the ring gears 24A and 24B. The plurality of fixation plates 35A and 35B and the plurality of rotation plates 36A and 36B are arranged alternately in the axial direction so that the plates 35A, 35B, 36A and 36B are engaged and released by annular pistons 37A and 37B. There is provided a lateral dividing wall 39 extended from an intermediate position of the decelerator case 11 to an inner diameter side region thereof, and annular cylinder chambers 38A and 38B are defined between the outer diameter side supporting portion 34 and an inner diameter side supporting portion 40, which are continuous with each other through the lateral dividing wall 39, so that the pistons 37A and 37B are contained in the annular cylinder chambers 38A and 38B, respectively, so as to be movable forward and backward. The pistons 37A and 37B are moved forward by introducing high pressure oil to the cylinder chambers 38A and 38B, and the pistons 37A and 37B are moved backward by discharging the oil from the cylinder chambers 38A and 38B. Note that as illustrated in FIG. 4, the hydraulic brakes 60A and 60B are connected to an electrically-operated oil pump 70 located between the supporting portions 13a and 13b of the foregoing frame member 13.

More specifically, the pistons 37A and 37B have first piston walls 63A and 63B and second piston walls 64A and 64B at axially front and rear positions, and the piston walls 63A, 63B, 64A and 64B are connected through cylindrical inner peripheral walls 65A and 65B. Accordingly, annular spaces opened radially outward are defined between the first piston walls 63A and 63B and the second piston walls 64A and 64B, and the annular spaces are partitioned laterally in the axial direction by partition members 66A and 66B fixed to inner peripheral surfaces of outer walls of the cylinder chambers 38A and 38B. Spaces between the lateral dividing wall 39 of the decelerator case 11 and the second piston walls 64A and 64B are defined as first operation chambers S1 (see FIG. 5) into which high pressure oil is directly introduced, and spaces between the partition members 66A and 66B and the first piston walls 63A and 63B are defined as second operation chambers S2 (see FIG. 5) communicated with the first operation chambers S1 via through holes formed in the inner peripheral walls 65A and 65B. Spaces between the second piston walls 64A and 64B and the partition members 66A and 66B are communicated with atmospheric pressure In the hydraulic brakes 60A and 60B, oil is introduced into the first and second operation chambers S1 and S2 through a hydraulic circuit 71 described later, thus allowing the fixation plates 35A and 35B and the rotation plates 36A and 36B to be pressed against each other by oil pressure exerted on the first piston walls 63A and 63B and the second piston walls 64A and 64B. Accordingly, a large pressure receiving area can be obtained by the first piston walls 63A and 63B and the second piston walls 64A and 64B which are axially laterally arranged. As a result, a large pressing force for the fixation plates 35A and 35B and the rotation plates 36A and 36B can be obtained while radial areas of the pistons 37A and 37B are reduced.

In the hydraulic brakes 60A and 60B, the fixation plates 35A and 35B are supported by the outer diameter side supporting portion 34 extended from the decelerator case 11, while the rotation plates 36A and 36B are supported by the ring gears 24A and 24B. Thus, when the fixation plates 35A and 35B and the rotation plates 36A and 36B are pressed by the pistons 37A and 37B, a braking force is exerted on the ring gears 24A and 24B to cause fixation due to frictional engagement between the fixation plates 35A and 35B and the rotation plates 36A and 36B. When the engagement caused by the pistons 37A and 37B is released from this state, free rotations of the ring gears 24A and 24B are allowed.

Further, a space is also ensured between the connection portions 30A and 30B of the ring gears 24A and 24B which axially face each other, and the one-way clutch 50, which allows transmission of power to the ring gears 24A and 24B in only one direction and interrupts transmission of power thereto in the other direction, is located in this space. The one-way clutch 50 is provided by interposition of a large number of sprags 53 between the inner race 51 and outer race 52, and is formed so that the small diameter portions 29A and 29B of the ring gears 24A and 24B are spline-fitted to the inner race 51, thus allowing the inner race 51 to be rotated integrally with the small diameter portions 29A and 29B of the ring gears 24A and 24B. Furthermore, positioning of the outer race 52 is determined by the inner diameter side supporting portion 40, and a rotation of the outer race 52 is prevented by the inner diameter side supporting portion 40. The one-way clutch 50 is formed so as to be engaged to lock the rotations of the ring gears 24A and 24B when the vehicle 3 moves forward by power from the motors 2A and 2B. More specifically, the one-way clutch 50 enters an engaged state when forward rotation power from the motors 2A and 2B (which is generated in the rotational direction when the vehicle 3 is moved forward) is inputted to the rear wheels Wr, and enters a non-engaged state when reverse rotational power from the motors 2A and 2B is inputted to the rear wheels Wr; on the other hand, the one-way clutch 50 enters the non-engaged state when forward rotation power from the rear wheels Wr is inputted to the motors 2A and 2B, and enters the engaged state when reverse rotational power from the rear wheels Wr is inputted to the motors 2A and 2B.

As described above, in the rear wheel driving apparatus 1 according to the present embodiment, the one-way clutch 50 and the hydraulic brakes 60A and 60B are provided in parallel on a power transmission path between the motors 2A and 2B and the rear wheels Wr.

Next, a hydraulic circuit 71 constituting a hydraulic control device of the rear wheel driving apparatus 1 will be described with reference to FIG. 5 to FIGS. 8A and 8B.

The hydraulic circuit 71 is formed so that oil, which is sucked up through a suction port 70a provided in an oil pan 80 and which is discharged from the electrically-operated oil pump 70, can be supplied to the first operation chambers S1 of the hydraulic brakes 60A and 60B via a low pressure oil passage switching valve 73 and a brake oil passage switching valve 74, and the oil can also be supplied, via the low pressure oil passage switching valve 73, to components 91 to be lubricated/cooled, e.g., the motors 2A and 2B and the planetary gear decelerators 12A and 12B. The decelerator case 11 stores the oil discharged from the electrically-operated oil pump 70 and supplied to the components 91, e.g., the motors 2A and 2B and the planetary gear decelerators 12A and 12B. Lower portions of the planetary carriers 23A and 23B and lower portions of the motors 2A and 2B are immersed in the oil. The electrically-operated oil pump 70 is allowed to operate (run) in at least two modes, i.e., a high pressure mode and a low pressure mode, by means of a motor 90 consisting of a position sensorless/brushless DC motor, and is controlled by PID control. Furthermore, the electrically-operated oil pump 70 is capable of adjusting oil pressure in each of the modes. Note that the reference character "92" represents a sensor for detecting oil temperature and oil pressure of a brake oil passage 77.

The low pressure oil passage switching valve 73 is connected to: a first line oil passage 75a included in a line oil passage 75 and connected to the electrically-operated oil pump 70; a second line oil passage 75b included in the line oil passage 75 and connected to the brake oil passage switching valve 74; a first low pressure oil passage 76a communicated with the components 91; and a second low pressure oil passage 76b communicated with the components 91. Further, the low pressure oil passage switching valve 73 includes: a valve body 73a through which the first line oil passage 75a and the second line oil passage 75b are communicated with each other at all times and through which the line oil passage 75 is selectively communicated with the first low pressure oil passage 76a or the second low pressure oil passage 76b; a spring 73b for urging the valve body 73a in a direction in which the line oil passage 75 and the first low pressure oil passage 76a are communicated with each other (i.e., toward the right in FIG. 5); and an oil chamber 73c for pressing the valve body 73a in a direction in which the line oil passage 75 and the second low pressure oil passage 76b are communicated with each other (i.e., toward the left in FIG. 5) by an oil pressure of the line oil passage 75. Accordingly, the valve body 73a is urged in the direction in which the line oil passage 75 and the first low pressure oil passage 76a are communicated with each other (i.e., toward the right in FIG. 5) by the spring 73b, and the valve body 73a is pressed in the direction in which the line oil passage 75 and the second low pressure oil passage 76b are communicated with each other (i.e., toward the left in FIG. 5) by the oil pressure of the line oil passage 75, which is fed to the oil chamber 73c at a right end of the low pressure oil passage switching valve 73 in FIG. 5.

Figure 6A:
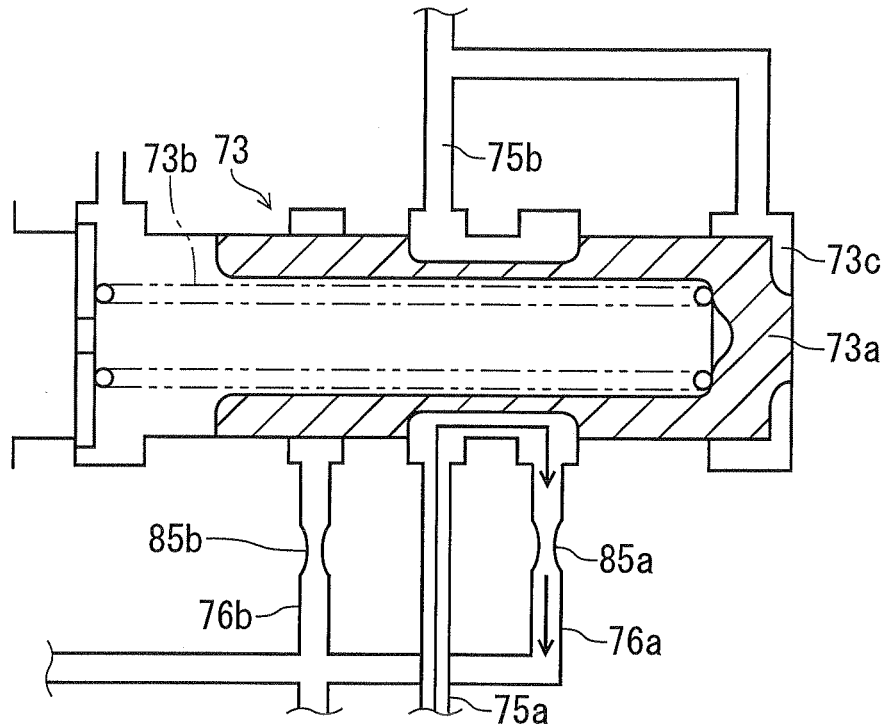
FIG. 6A is an explanatory diagram illustrating a state in which a low pressure oil passage switching valve is located at a low pressure side position.
Figure 6B:
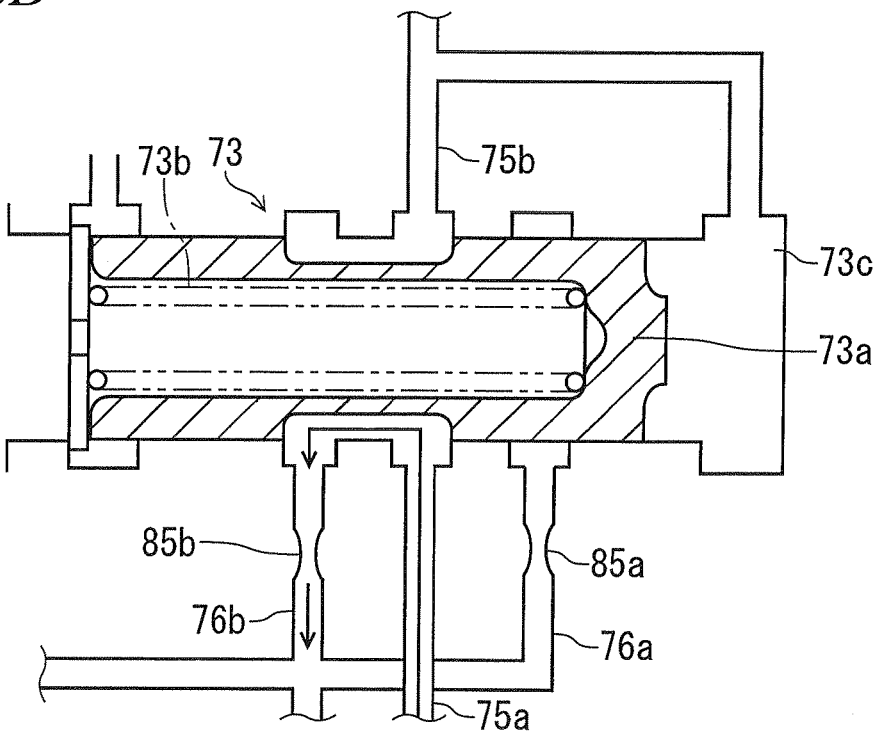
FIG. 6B is an explanatory diagram illustrating a state in which the low pressure oil passage switching valve is located at a high pressure side position.
Figure 7A:
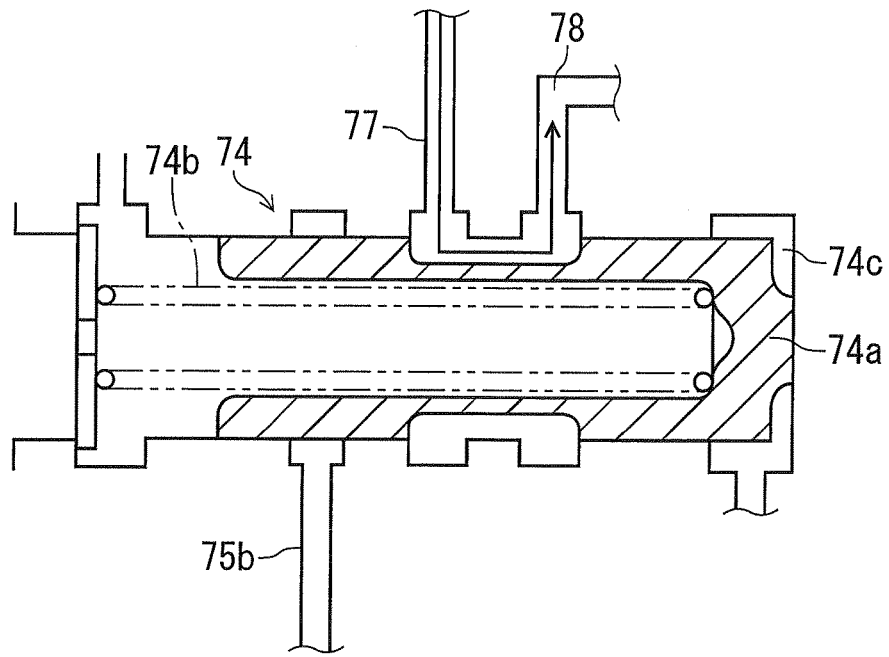
FIG. 7A is an explanatory diagram illustrating a state in which a brake oil passage switching valve is located at a valve closing position.
Figure 7B:
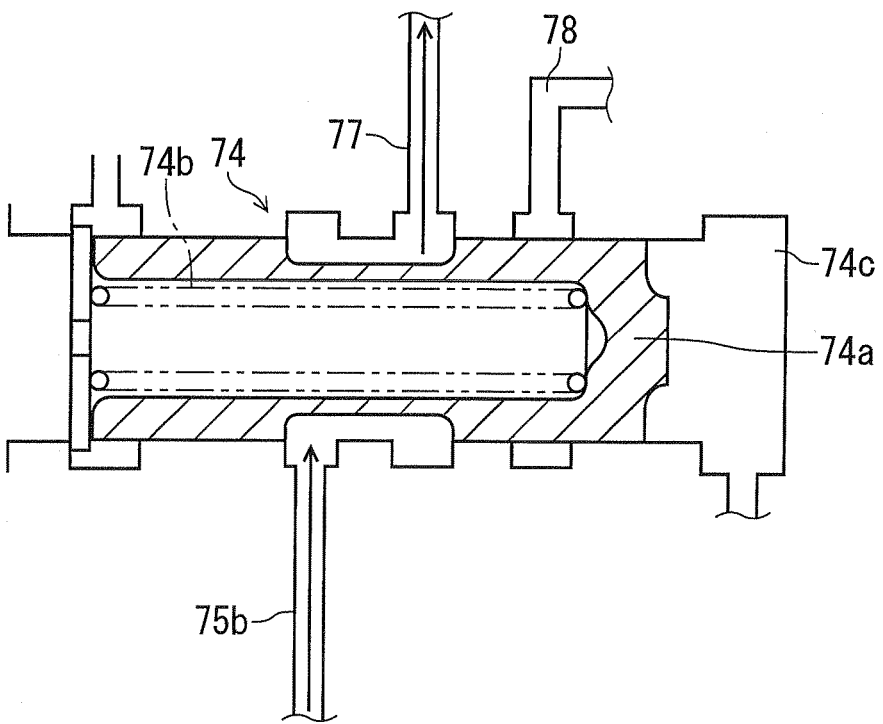
FIG. 7B is an explanatory diagram illustrating a state in which the brake oil passage switching valve is located at a valve opening position.

In this embodiment, an urging force of the spring 73b is set as follows. At the oil pressure of the line oil passage 75 fed to the oil chamber 73c during operation of the electrically-operated oil pump 70 in the low pressure mode, the movement of the valve body 73a is prevented by the urging force of the spring 73b so that the communication of the line oil passage 75 with the second low pressure oil passage 76b is interrupted and the line oil passage 75 is communicated with the first low pressure oil passage 76a as illustrated in FIG. 6A (hereinafter, the position of the valve body 73a in FIG. 6A will be referred to as a "low pressure side position"). At the oil pressure of the line oil passage 75 fed to the oil chamber 73c during operation of the electrically-operated oil pump 70 in the high pressure mode, the valve body 73a is moved against the urging force of the spring 73b so that the communication of the line oil passage 75 with the first low pressure oil passage 76a is interrupted and the line oil passage 75 is communicated with the second low pressure oil passage 76b as illustrated in FIG. 6B (hereinafter, the position of the valve body 73a in FIG. 6B will be referred to as a "high pressure side position").

The brake oil passage switching valve 74 is connected to: the second line oil passage 75b included in the line oil passage 75; and the brake oil passage 77 connected to the hydraulic brakes 60A and 60B, and is further connected to a reservoir 79 via a high position drain 78. Furthermore, the brake oil passage switching valve 74 includes: a valve body 74a for allowing/interrupting communication between the second line oil passage 75b and the brake oil passage 77; a spring 74b for urging the valve body 74a in a direction in which the communication between the second line oil passage 75b and the brake oil passage 77 is interrupted (i.e., toward the right in FIG. 5); and an oil chamber 74c for pressing the valve body 74a in a direction in which the second line oil passage 75b and the brake oil passage 77 are communicated with each other (i.e., toward the left in FIG. 5) by the oil pressure of the line oil passage 75. Accordingly, the valve body 74a is urged in the direction in which the communication between the second line oil passage 75b and the brake oil passage 77 is interrupted (i.e., toward the right in FIG. 5) by the spring 74b, and the valve body 74a can be pressed in the direction in which the second line oil passage 75b and the brake oil passage 77 are communicated with each other (i.e., toward the left in FIG. 5) by the oil pressure of the line oil passage 75, which is fed to the oil chamber 74c.

An urging force of the spring 74b is set as follows. At the oil pressure of the line oil passage 75 fed to the oil chamber 74c during operation of the electrically-operated oil pump 70 in the low pressure mode and high pressure mode, the valve body 74a is moved from a valve closing position of FIG. 7A to a valve opening position of FIG. 7B against the urging force of the spring 74b so that the communication of the brake oil passage 77 with the high position drain 78 is interrupted and the brake oil passage 77 is communicated with the second line oil passage 75b. In other words, regardless of whether the electrically-operated oil pump 70 is operated in the low pressure mode or the high pressure mode, the oil pressure of the line oil passage 75 fed to the oil chamber 74c exceeds the urging force of the spring 74b, so that the communication of the brake oil passage 77 with the high position drain 78 is interrupted and the brake oil passage 77 is communicated with the second line oil passage 75b.

In the state where the communication between the second line oil passage 75b and the brake oil passage 77 is interrupted, the hydraulic brakes 60A and 60B are communicated with the reservoir 79 via the brake oil passage 77 and the high position drain 78. In this embodiment, the reservoir 79 is provided at a position vertically higher than that of the oil pan 80. The reservoir 79 is more preferably provided so that a vertical uppermost position of the reservoir 79 is vertically higher than midpoints between vertical uppermost positions and vertical lowermost positions of the first operation chambers S1 of the hydraulic brakes 60A and 60B. Accordingly, in the state where the brake oil passage switching valve 74 is closed, oil stored in the first operation chambers S1 of the hydraulic brakes 60A and 60B is not directly discharged to the oil pan 80 but is discharged to and stored in the reservoir 79. Note that oil spilled from the reservoir 79 will be discharged to the oil pan 80. Moreover, an end 78a of the high position drain 78, which is adjacent to the reservoir 79, is connected to a bottom surface of the reservoir 79.

The oil chamber 74c of the brake oil passage switching valve 74 is connectable, via a pilot oil passage 81 and a solenoid valve 83, to the second line oil passage 75b included in the line oil passage 75. The solenoid valve 83 is formed by an electromagnetic three-way valve controlled by the control device 8. When energization to a solenoid 174 (see FIGS. 8A and 8B) of the solenoid valve 83 is stopped by the control device 8, the second line oil passage 75b is connected to the pilot oil passage 81, and the oil pressure of the line oil passage 75 is fed to the oil chamber 74c.

Figure 8A:
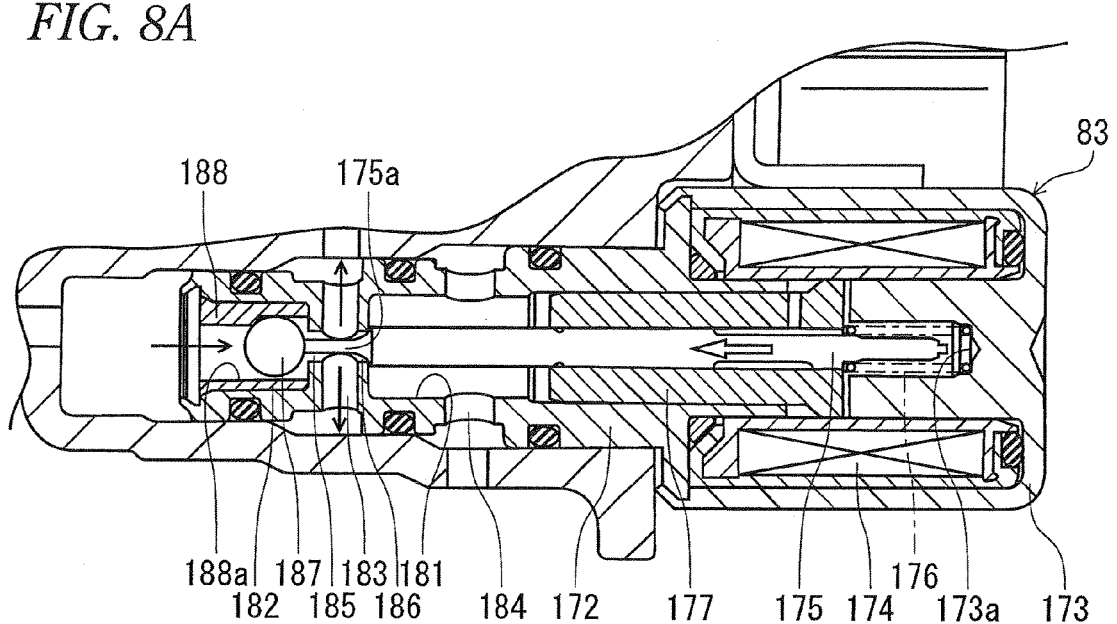
FIG. 8A is an explanatory diagram illustrating a solenoid valve at the time of non-energization.
Figure 8B:
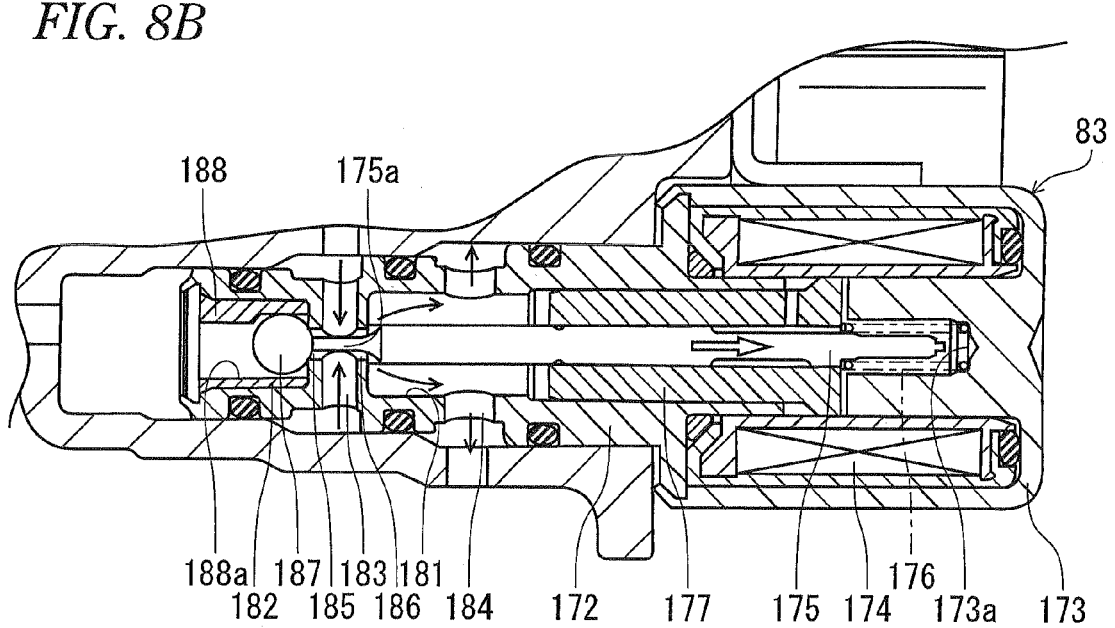
FIG. 8B is an explanatory diagram illustrating the solenoid valve at the time of energization.

As illustrated in FIGS. 8A and 8B, the solenoid valve 83 includes: a three-way valve member 172; the solenoid 174 provided in a case member 173 and excited upon reception of power supplied via a cable (not illustrated); a solenoid valve body 175 pulled rightward upon reception of an excitation force of the solenoid 174; a solenoid spring 176 which is contained in a spring holding concave 173a formed at a center of the case member 173 and by which the solenoid valve body 175 is urged leftward; and a guide member 177 which is provided inside the three-way valve member 172 and through which forward and backward movements of the solenoid valve body 175 are slidably guided.

The three-way valve member 172 is an approximately cylindrical member having a bottom. The three-way valve member 172 has: a right concave hole 181 formed from a right end of the three-way valve member 172 to an approximately intermediate position thereof along a center line of the three-way valve member 172; a left concave hole 182 formed from a left end of the three-way valve member 172 to a position close to the right concave hole 181 along the center line; a first radial hole 183 formed between the right concave hole 181 and the left concave hole 182 along a direction orthogonal to the center line; a second radial hole 184 formed along a direction orthogonal to the center line so as to be communicated with an approximately intermediate portion of the right concave hole 181; a first axial hole 185 which is formed along the center line and through which the left concave hole 182 and the first radial hole 183 are communicated with each other; and a second axial hole 186 which is formed along the center line and through which the first radial hole 183 and the right concave hole 181 are communicated with each other.

Further, a ball 187 for opening/closing the first axial hole 185 is inserted into a bottom of the left concave hole 182 of the three-way valve member 172 so as to be movable in a lateral direction, and a cap 188 for restricting detachment of the ball 187 is fitted into an inlet side portion of the left concave hole 182. Furthermore, in the cap 188, a through hole 188a communicated with the first axial hole 185 is formed along the center line.

Besides, the second axial hole 186 is opened/closed by contact or non-contact of a root portion of an opening/closing protrusion 175a formed at a left end of the laterally moving solenoid valve body 175. In addition, the ball 187 for opening/closing the first axial hole 185 is laterally moved by a tip of the opening/closing protrusion 175a of the laterally moving solenoid valve body 175.

Moreover, the solenoid valve 83 is operated as follows. As illustrated in FIG. 8A, when energization to the solenoid 174 is stopped (i.e., when supply of power to the solenoid 174 is stopped), the solenoid valve body 175 is moved leftward upon reception of an urging force of the solenoid spring 176, and the tip of the opening/closing protrusion 175a of the solenoid valve body 175 pushes the ball 187; thus, the first axial hole 185 is opened, and the root portion of the opening/closing protrusion 175a of the solenoid valve body 175 comes into contact with the second axial hole 186, thereby closing the second axial hole 186. As a result, the second line oil passage 75b, included in the line oil passage 75, is communicated with the oil chamber 74c via the first axial hole 185, the first radial hole 183 and the pilot oil passage 81 (hereinafter, the position of the solenoid valve body 175 in FIG. 8A may be referred to as a "valve opening position").

On the other hand, as illustrated in FIG. 8B, when energization to the solenoid 174 is carried out (i.e., when supply of power to the solenoid 174 is carried out), the solenoid valve body 175 is moved rightward against the urging force of the solenoid spring 176 upon reception of the excitation force of the solenoid 174, and the oil pressure supplied through the through hole 188a pushes the ball 187; thus, the first axial hole 185 is closed, and the root portion of the opening/closing protrusion 175a of the solenoid valve body 175 goes away from the second axial hole 186, thereby opening the second axial hole 186. As a result, the oil stored in the oil chamber 74c is discharged to the oil pan 80 via the first radial hole 183, the second axial hole 186 and the second radial hole 184, and the communication between the second line oil passage 75b and the pilot oil passage 81 is interrupted (hereinafter, the position of the solenoid valve body 175 in FIG. 8B may be referred to as a "valve closing position").

Referring again to FIG. 5, in the hydraulic circuit 71, the first low pressure oil passage 76a and the second low pressure oil passage 76b are merged with each other at a downstream side position to form a common low pressure oil passage 76c, and the merged portion is connected with a relief valve 84 for allowing oil in the common low pressure oil passage 76c to be discharged to the oil pan 80 via a relief drain 86 to reduce oil pressure when a line pressure of the common low pressure oil passage 76c is equal to or higher than a given pressure.

In this embodiment, as illustrated in FIGS. 6A and 6B, orifices 85a and 85b serving as flow passage resistance means are formed in the first low pressure oil passage 76a and the second low pressure oil passage 76b, respectively, and the orifice 85a of the first low pressure oil passage 76a is formed so as to be larger in diameter than the orifice 85b of the second low pressure oil passage 76b. Accordingly, a flow passage resistance of the second low pressure oil passage 76b is higher than that of the first low pressure oil passage 76a, and an amount of pressure reduction through the second low pressure oil passage 76b during operation of the electrically-operated oil pump 70 in the high pressure mode is greater than an amount of pressure reduction through the first low pressure oil passage 76a during operation of the electrically-operated oil pump 70 in the low pressure mode. As a result, the oil pressure of the common low pressure oil passage 76c in the high pressure mode and that of the common low pressure oil passage 76c in the low pressure mode are substantially equal to each other.

As described above, the low pressure oil passage switching valve 73, connected to the first low pressure oil passage 76a and the second low pressure oil passage 76b, is operated as follows. During operation of the electrically-operated oil pump 70 in the low pressure mode, the urging force of the spring 73b exceeds the oil pressure inside the oil chamber 73c, and the valve body 73a is located at the low pressure side position due to the urging force of the spring 73b, thus interrupting the communication of the line oil passage 75 with the second low pressure oil passage 76b and allowing the line oil passage 75 to be communicated with the first low pressure oil passage 76a. The oil flowing through the first low pressure oil passage 76a is reduced in pressure upon reception of flow passage resistance of the orifice 85a, and then reaches the components 91, which are to be lubricated/cooled, via the common low pressure oil passage 76c. On the other hand, during operation of the electrically-operated oil pump 70 in the high pressure mode, the oil pressure inside the oil chamber 73c exceeds the urging force of the spring 73b, and the valve body 73a is located at the high pressure side position against the urging force of the spring 73b, thus interrupting the communication of the line oil passage 75 with the first low pressure oil passage 76a and allowing the line oil passage 75 to be communicated with the second low pressure oil passage 76b. The oil flowing through the second low pressure oil passage 76b is reduced in pressure upon reception of the flow passage resistance of the orifice 85b greater than that of the orifice 85a, and then reaches the components 91, which are to be lubricated/cooled, via the common low pressure oil passage 76c.

Accordingly, when the operation mode of the electrically-operated oil pump 70 is switched from the low pressure mode to the high pressure mode, the oil passage is automatically switched from the oil passage having a low flow passage resistance to the oil passage having a high flow passage resistance in accordance with a change in the oil pressure of the line oil passage 75; thus, when the electrically-operated oil pump 70 is operated in the high pressure mode, excessive supply of oil to the components 91 is suppressed.

Further, oil passages, extending from the common low pressure oil passage 76c to reach the components 91, are provided with a plurality of orifices 85c serving as another flow passage resistance means. The plurality of orifices 85c are set so that a minimum flow passage cross-sectional area of the orifice 85a of the first low pressure oil passage 76a is smaller than that of the plurality of orifices 85c. In other words, the flow passage resistance of the orifice 85a of the first low pressure oil passage 76a is set so as to be higher than that of the plurality of orifices 85c. In this case, the minimum flow passage cross-sectional area of the plurality of orifices 85c means a total sum of minimum flow passage cross-sectional areas of the orifices 85c. Thus, a flow rate is adjustable and a desired flow rate is achievable by the orifice 85a of the first low pressure oil passage 76a and the orifice 85b of the second low pressure oil passage 76b.

In this embodiment, the control device 8 (see FIG. 1) is a control device for performing various types of control for the entire vehicle. Data inputted to the control device 8 includes: a vehicle speed; a steering angle; an accelerator pedal opening ΔP; a shift position; an SOC; and an oil temperature. On the other hand, signals outputted from the control device 8 include: a signal for controlling the internal combustion engine 4; a signal for controlling the motors 2A and 2B; a signal indicative of a power generation state, a charge state or a discharge state of the battery 9; a control signal for the solenoid 174 of the solenoid valve 83; and a control signal for controlling the electrically-operated oil pump 70.

In other words, the control device 8 is configured to control the motors 2A and 2B; and also is configured to control the hydraulic brakes 60A and 60B. The control device 8 is configured to control the electrically-operated oil pump 70 and the solenoid 174 of the solenoid valve 83 based on driving states of the motors 2A and 2B and/or driving commands (driving signals) for the motors 2A and 2B.

Next, how the hydraulic circuit 71 of the rear wheel driving apparatus 1 is operated will be described.

Figure 5:
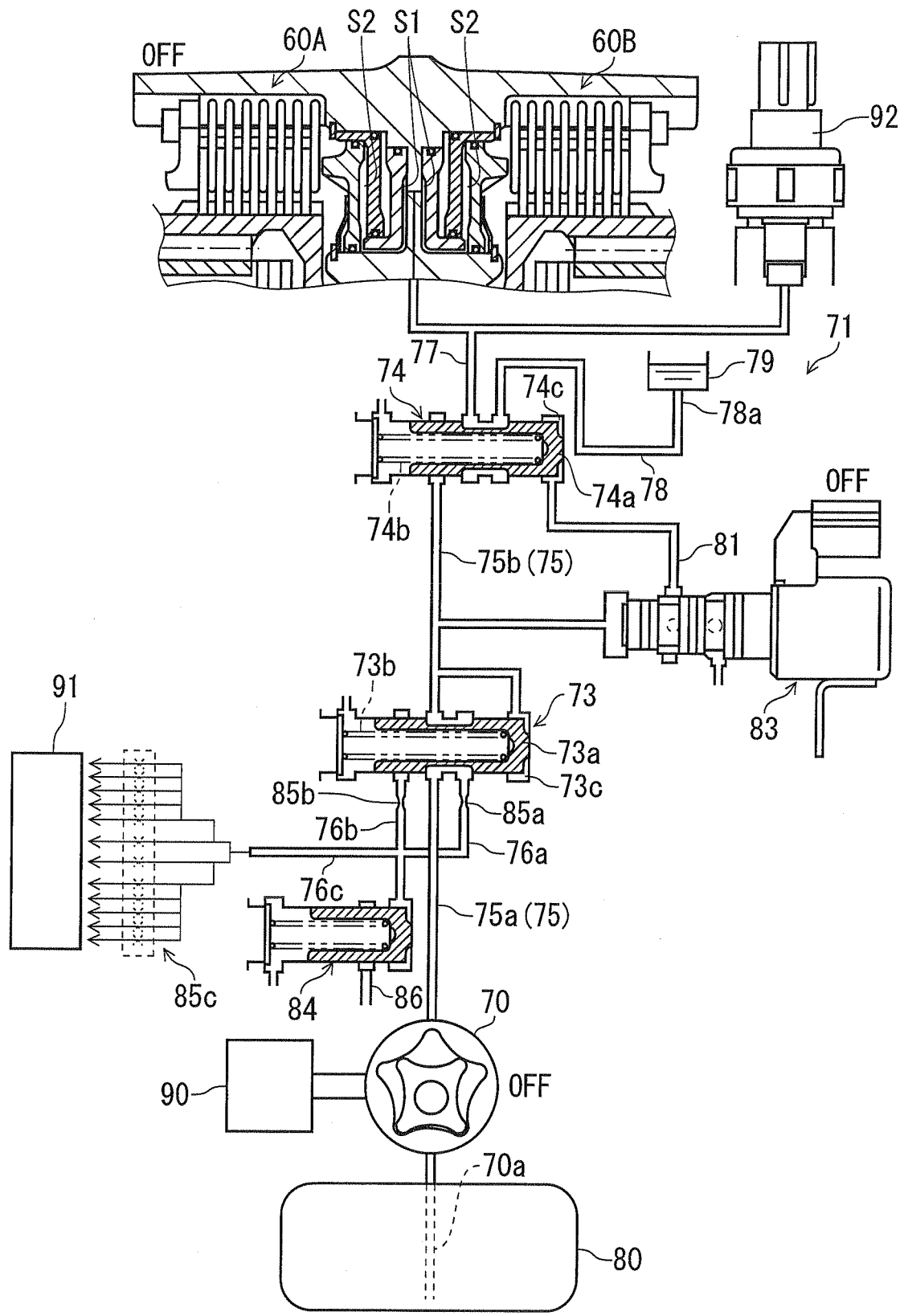
FIG. 5 is a hydraulic circuit diagram that illustrates a hydraulic control device for controlling hydraulic brakes, and describes a state in which no oil pressure is supplied.

FIG. 5 illustrates the hydraulic circuit 71 in a state where the hydraulic brakes 60A and 60B are released during stoppage of the vehicle. In this state, the electrically-operated oil pump 70 is not operated by the control device 8. Thus, the valve body 73a of the low pressure oil passage switching valve 73 is located at the low pressure side position, the valve body 74a of the brake oil passage switching valve 74 is located at the valve closing position, and no oil pressure is supplied to the hydraulic circuit 71.

Figure 9:
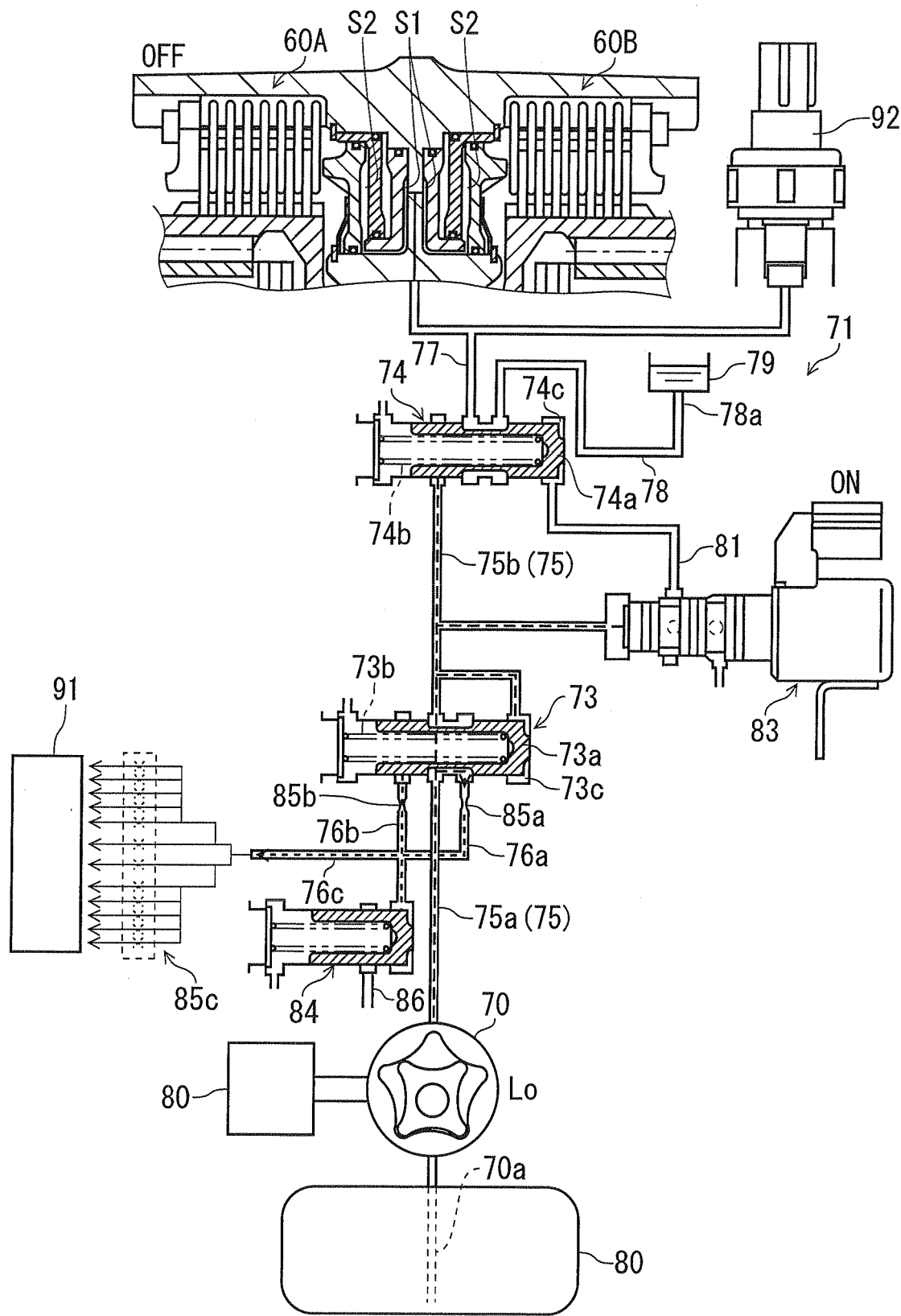
FIG. 9 is a hydraulic circuit diagram illustrating the hydraulic control device during traveling in a state where the hydraulic brakes are released (EOP: low pressure mode)

FIG. 9 illustrates a state where the hydraulic brakes 60A and 60B are released during traveling of the vehicle. In this state, the electrically-operated oil pump 70 is operated in the low pressure mode by the control device 8. Further, the control device 8 energizes the solenoid 174 of the solenoid valve 83, and the communication between the second line oil passage 75b and the pilot oil passage 81 is interrupted. Thus, the valve body 74a of the brake oil passage switching valve 74 is located at the valve closing position due to the urging force of the spring 74b, and the communication between the second line oil passage 75b and the brake oil passage 77 is interrupted; in addition, the brake oil passage 77 and the high position drain 78 are communicated with each other, and the hydraulic brakes 60A and 60B are released. Furthermore, the brake oil passage 77 is connected to the reservoir 79 via the high position drain 78.

Moreover, in the low pressure oil passage switching valve 73, the urging force of the spring 73b exceeds the oil pressure of the line oil passage 75, which is fed to the oil chamber 73c at the right end of the low pressure oil passage switching valve 73 in FIG. 9 during operation of the electrically-operated oil pump 70 in the low pressure mode. Hence, the valve body 73a is located at the low pressure side position, the communication of the line oil passage 75 with the second low pressure oil passage 76b is interrupted, and the line oil passage 75 is communicated with the first low pressure oil passage 76a. Thus, the oil in the line oil passage 75 is reduced in pressure through the orifice 85a via the first low pressure oil passage 76a, and is supplied to the components 91.

Figure 10:
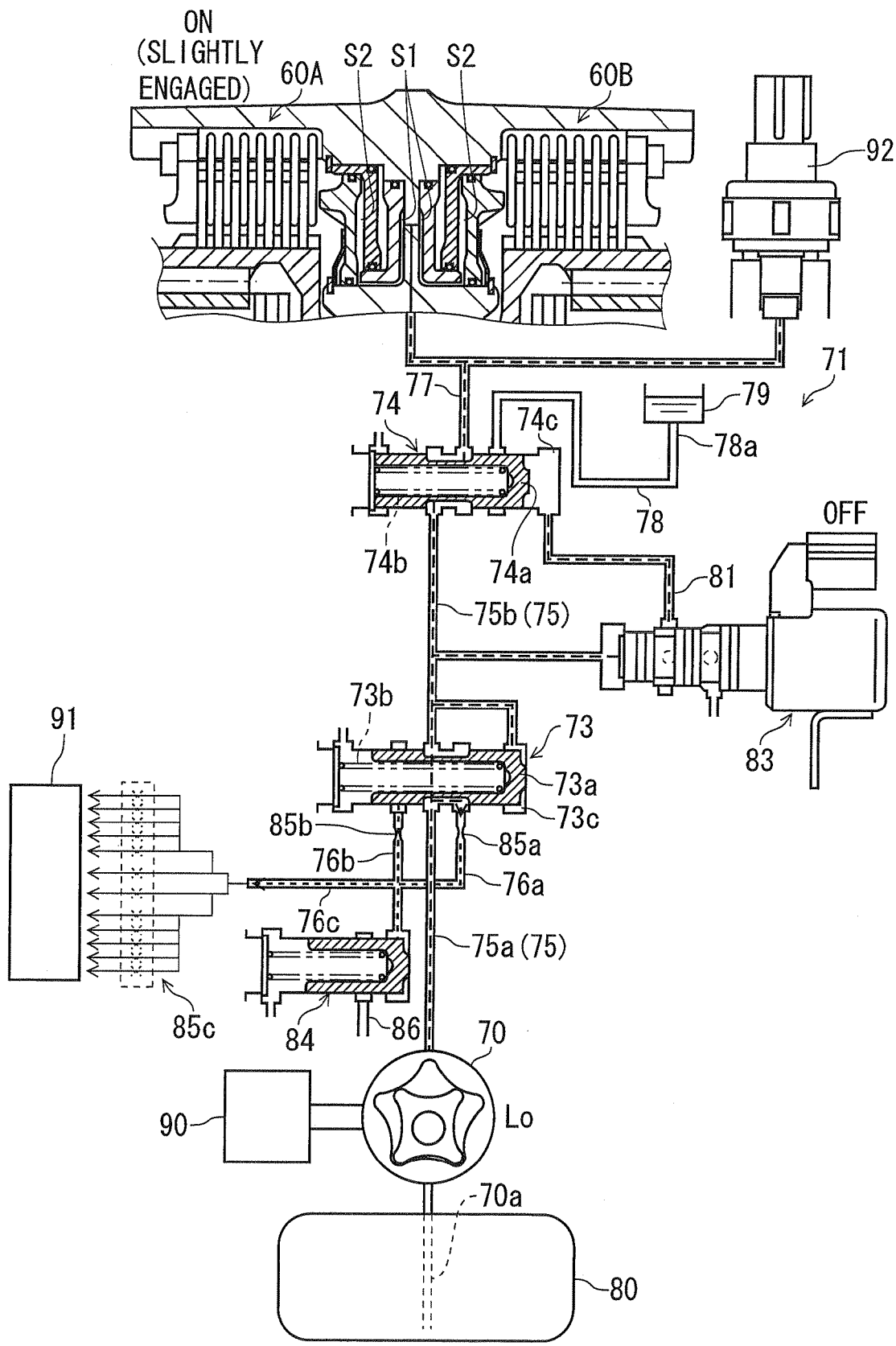
FIG. 10 is a hydraulic circuit diagram illustrating the hydraulic control device in a state where the hydraulic brakes are slightly engaged (EOP: low pressure mode)

FIG. 10 illustrates the hydraulic circuit 71 in a state where the hydraulic brakes 60A and 60B are slightly engaged. Note that "the state where the hydraulic brakes 60A and 60B are slightly engaged" means a state where power is transmittable but the hydraulic brakes 60A and 60B are engaged by an engagement force lower than an engagement force by which the hydraulic brakes 60A and 60B are engaged. In this state, the electrically-operated oil pump 70 is operated in the low pressure mode by the control device 8. Further, the control device 8 stops energization to the solenoid 174 of the solenoid valve 83, and feeds the oil pressure of the second line oil passage 75b to the oil chamber 74c of the brake oil passage switching valve 74. Thus, the oil pressure inside the oil chamber 74c exceeds the urging force of the spring 74b, so that the valve body 74a is located at the valve opening position and the communication between the brake oil passage 77 and the high position drain 78 is interrupted; in addition, the second line oil passage 75b and the brake oil passage 77 are communicated with each other, and the hydraulic brakes 60A and 60B are slightly engaged.

Also in this case, similarly to the case where the hydraulic brakes 60A and 60B are released, the urging force of the spring 73b exceeds the oil pressure of the line oil passage 75 fed to the oil chamber 73c at the right end of the low pressure oil passage switching valve 73 in FIG. 10 during operation of the electrically-operated oil pump 70 in the low pressure mode; hence, in the low pressure oil passage switching valve 73, the valve body 73a is located at the low pressure side position, the communication of the line oil passage 75 with the second low pressure oil passage 76b is interrupted, and the line oil passage 75 is communicated with the first low pressure oil passage 76a. Thus, the oil in the line oil passage 75 is reduced in pressure through the orifice 85a via the first low pressure oil passage 76a, and is then supplied to the components 91.

Figure 11:
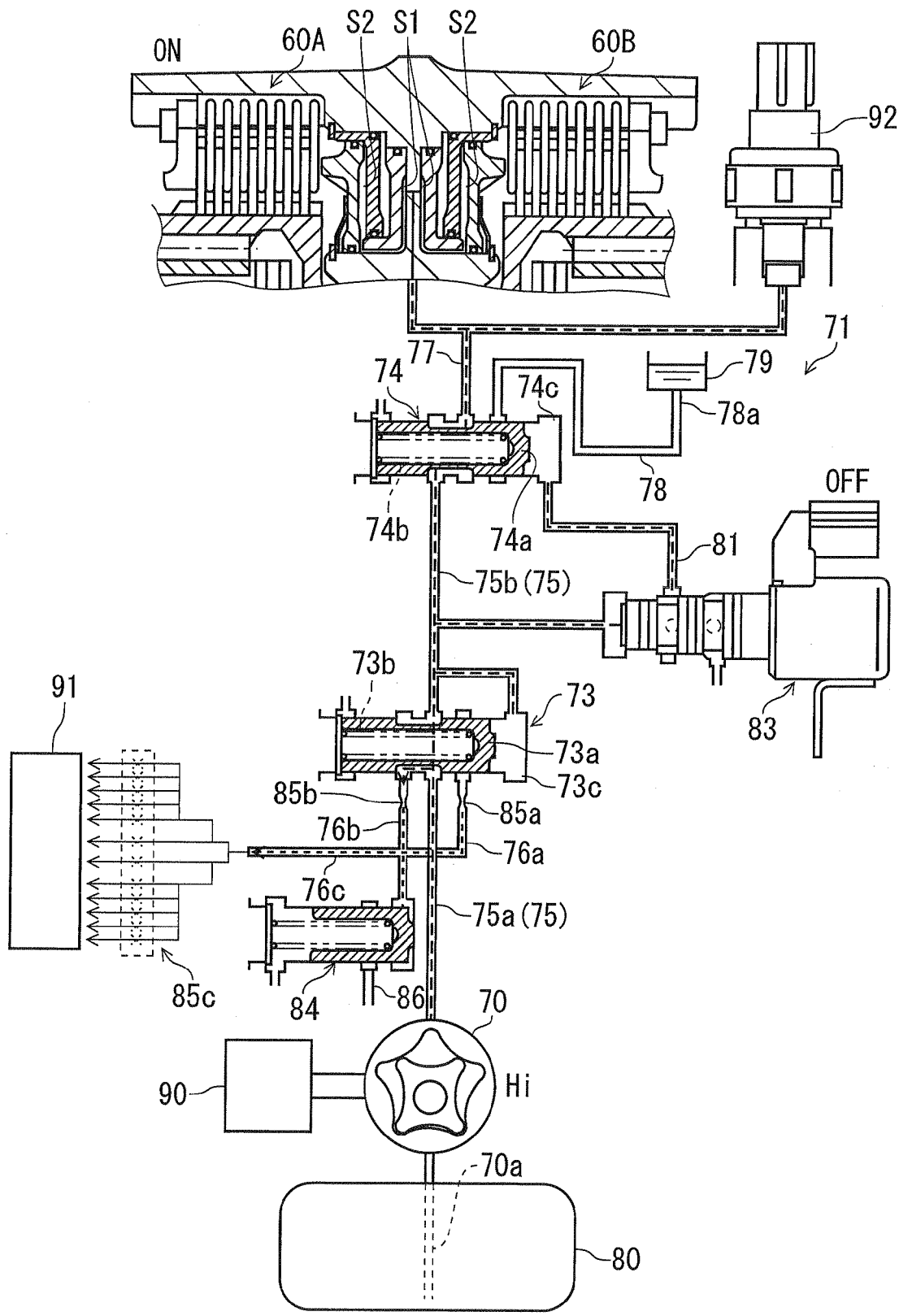
FIG. 11 is a hydraulic circuit diagram illustrating the hydraulic control device in a state where the hydraulic brakes are engaged (EOP: high pressure mode)

FIG. 11 illustrates the hydraulic circuit 71 in a state where the hydraulic brakes 60A and 60B are engaged. In this state, the electrically-operated oil pump 70 is operated in the high pressure mode by the control device 8. Further, the control device 8 stops energization to the solenoid 174 of the solenoid valve 83, and feeds the oil pressure of the second line oil passage 75b to the oil chamber 74c at the right end of the brake oil passage switching valve 74. Thus, the oil pressure inside the oil chamber 74c exceeds the urging force of the spring 74b, so that the valve body 74a is located at the valve opening position and the communication between the brake oil passage 77 and the high position drain 78 is interrupted; in addition, the second line oil passage 75b and the brake oil passage 77 are communicated with each other, and the hydraulic brakes 60A and 60B are engaged.

The oil pressure of the line oil passage 75, fed to the oil chamber 73c at the right end of the low pressure oil passage switching valve 73 in FIG. 11 during operation of the electrically-operated oil pump 70 in the high pressure mode, exceeds the urging force of the spring 73b; hence, in the low pressure oil passage switching valve 73, the valve body 73a is located at the high pressure side position, so that the communication of the line oil passage 75 with the first low pressure oil passage 76a is interrupted and the line oil passage 75 is communicated with the second low pressure oil passage 76b. Thus, the oil in the line oil passage 75 is reduced in pressure through the orifice 85b via the second low pressure oil passage 76b, and is then supplied to the components 91.

As described above, the control device 8 controls the operation mode (running state) of the electrically-operated oil pump 70 and opening/closing of the solenoid valve 83; thus, the control device 8 is capable of releasing or engaging the hydraulic brakes 60A and 60B, allowing switching between a state in which the connection between the motors 2A and 2B and the rear wheels Wr is interrupted and a state in which the motors 2A and 2B and the rear wheels Wr are connected, and controlling the engagement force for the hydraulic brakes 60A and 60B.

Figure 12:
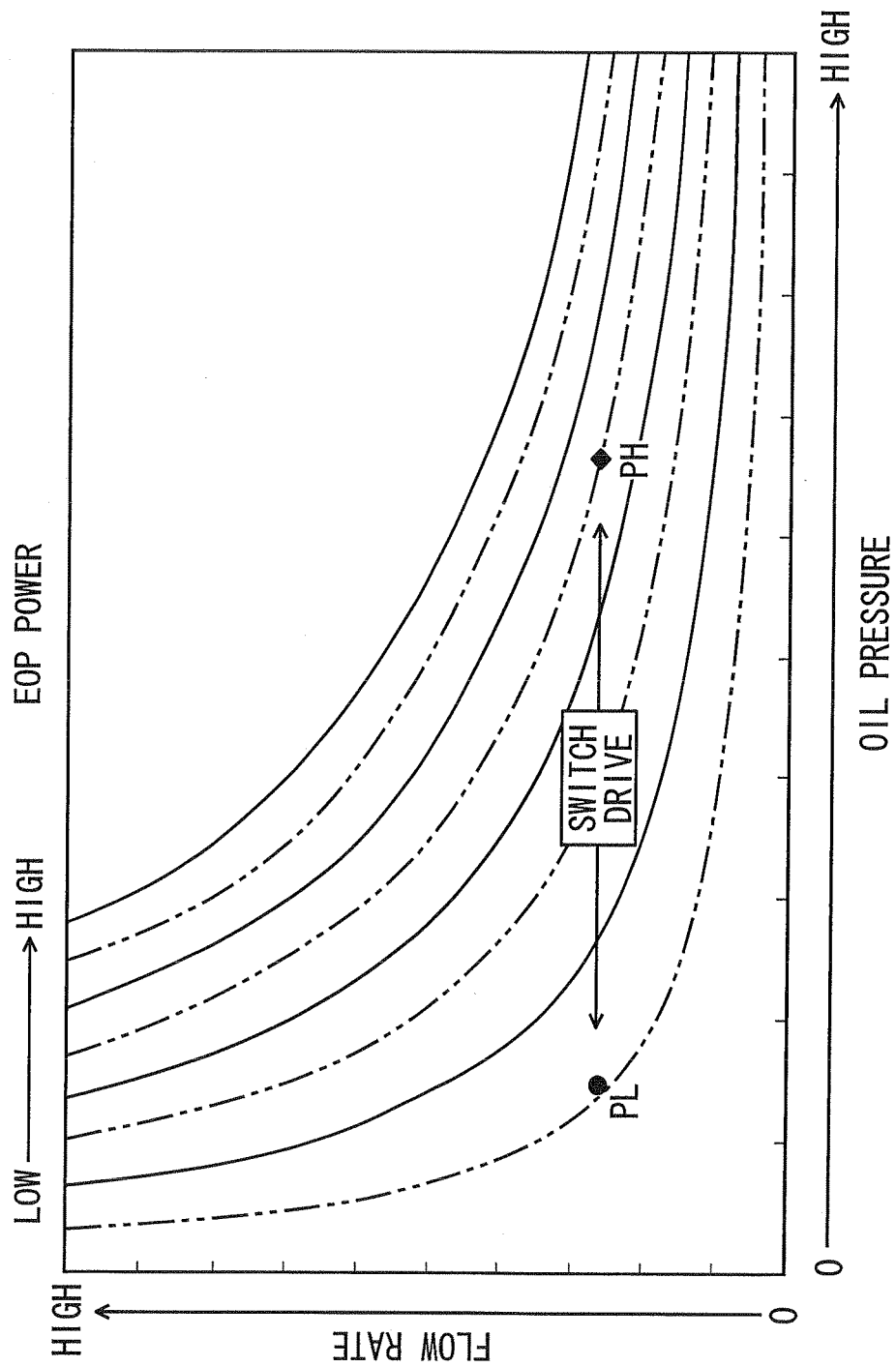
FIG. 12 is a graph illustrating load characteristics of an electrically-operated oil pump.

FIG. 12 is a graph illustrating load characteristics of the electrically-operated oil pump 70.

As illustrated in FIG. 12, as compared with the high pressure mode (oil pressure PH), the low pressure mode (oil pressure PL) can reduce a power of the electrically-operated oil pump 70 to about ¼ to about ⅕ while maintaining the flow rate of supplied oil. In other words, in the low pressure mode, the load on the electrically-operated oil pump 70 is low, and energy consumption by the motor 90 for driving the electrically-operated oil pump 70 can be reduced as compared with the high pressure mode.

FIG. 13 is a table illustrating a relationship between the front wheel driving apparatus 6 and the rear wheel driving apparatus 1 with respect to each vehicle state, together with operating states of the motors 2A and 2B and a state of the hydraulic circuit 71. In FIG. 13, "FRONT UNIT" represents the front wheel driving apparatus 6, "REAR UNIT" represents the rear wheel driving apparatus 1, "REAR MOTOR" represents the motors 2A and 2B, "EOP" represents the electrically-operated oil pump 70, "SOL" represents the solenoid 174, "OWC" represents the one-way clutch 50, and "BRK" represents the hydraulic brakes 60A and 60B. Further, FIGS. 14 to 19 illustrate speed collinear diagrams of the rear wheel driving apparatus 1 in the respective states. In each of FIGS. 14 to 19, "S" and "C" at the left side represent the sun gear 21A of the planetary gear decelerator 12A connected to the motor 2A, and the planetary carrier 23A connected to the vehicle axle 10A, respectively, "S" and "C" at the right side represent the sun gear 21B of the planetary gear decelerator 12B connected to the motor 2B, and the planetary carrier 23B connected to the vehicle axle 10B, respectively, "R" represents the ring gears 24A and 24B, "BRK" represents the hydraulic brakes 60A and 60B, and "OWC" represents the one-way clutch 50. In the following description, rotation directions of the sun gears 21A and 21B when the vehicle is moved forward by the motors 2A and 2B are each defined as the forward direction. Furthermore, in each of FIGS. 14 to 19, a region above a vehicle stoppage state represents a forward rotation, a region below the vehicle stoppage state represents a reverse rotation, an upward arrow represents a forward torque, and a downward arrow represents a reverse torque.

Figure 14:
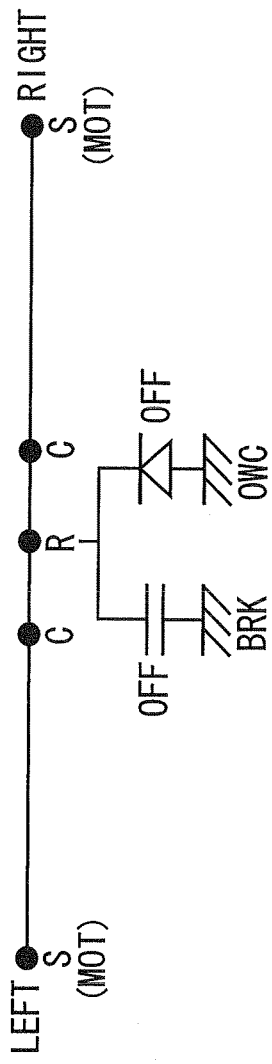
FIG. 14 is a speed collinear diagram of the rear wheel driving apparatus during stoppage of the vehicle.

During vehicle stoppage, neither the front wheel driving apparatus 6 nor the rear wheel driving apparatus 1 is driven. Accordingly, as illustrated in FIG. 14, the motors 2A and 2B of the rear wheel driving apparatus 1 are stopped, and the vehicle axles 10A and 10B are also stopped; hence, no torque is exerted on any of the elements. In the hydraulic circuit 71 during stoppage of the vehicle 3, as illustrated in FIG. 5, the electrically-operated oil pump 70 is not running, and energization to the solenoid 174 of the solenoid valve 83 is stopped; however, since no oil pressure is supplied, the hydraulic brakes 60A and 60B are released (OFF). Further, since the motors 2A and 2B are not driven, the one-way clutch 50 is not engaged (OFF).

Figure 15:
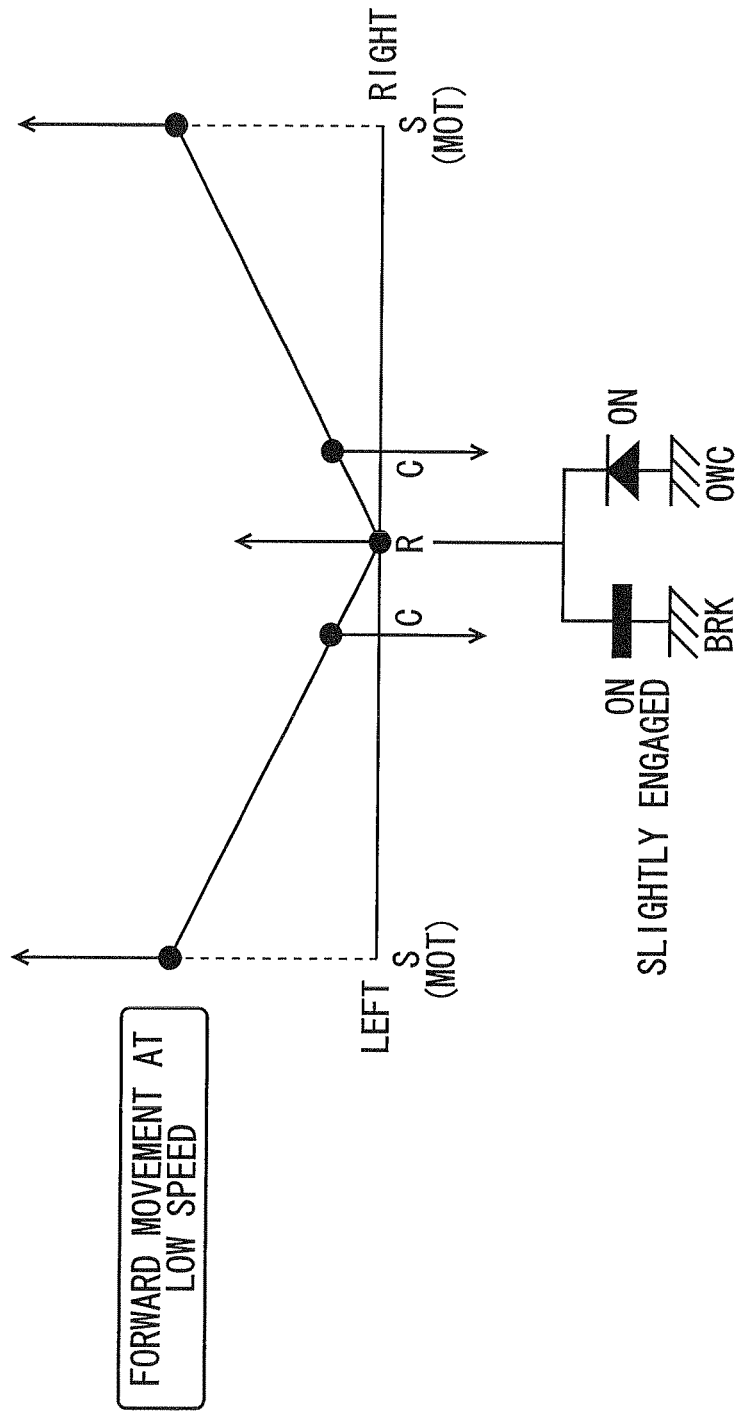
FIG. 15 is a speed collinear diagram of the rear wheel driving apparatus when the vehicle moves forward at a low speed.

Then, after an ignition is turned ON, rear wheel driving is performed by the rear wheel driving apparatus 1 when the vehicle moves forward at a low speed with a high motor efficiency, e.g., in the case of EV starting or EV cruising. As illustrated in FIG. 15, when power driving is performed so that the motors 2A and 2B are rotated in the forward direction, a forward torque is applied to each of the sun gears 21A and 21B. In this case, the one-way clutch 50 is engaged and the ring gears 24A and 24B are locked as mentioned above. Thus, the planetary carriers 23A and 23B are rotated in the forward direction, and the vehicle travels forward. Note that traveling resistance is exerted on the planetary carriers 23A and 23B from the vehicle axles 10A and 10B in the reverse direction. As described above, when the vehicle 3 starts to move, the ignition is turned ON, and torques of the motors 2A and 2B are increased, thereby mechanically engaging the one-way clutch 50 to lock the ring gears 24A and 24B.

In this case, in the hydraulic circuit 71, the electrically-operated oil pump 70 runs in the low pressure mode (Lo), the solenoid 174 of the solenoid valve 83 is not energized (OFF), and the hydraulic brakes 60A and 60B are in the slightly engaged state as illustrated in FIG. 10. As mentioned above, when forward rotation power from the motors 2A and 2B is inputted to the rear wheels Wr, the one-way clutch 50 enters the engaged state, and power transmission is enabled by the one-way clutch 50 alone. However, the hydraulic brakes 60A and 60B provided in parallel with the one-way clutch 50 are also slightly engaged, and the motors 2A and 2B and the rear wheels Wr are put in a connected state; thus, even when the forward rotation power inputted to the rear wheels Wr from the motors 2A and 2B is temporarily reduced and the one-way clutch 50 enters the non-engaged state, power transmission between the motors 2A and 2B and the rear wheels Wr can be prevented from being disabled. Further, when a shift is made to deceleration regeneration described later, rotational frequency control for allowing the motors 2A and 2B and the rear wheels Wr to enter the connected state becomes unnecessary. The engagement force of the hydraulic brakes 60A and 60B in this case is lower than that of the hydraulic brakes 60A and 60B at the time of deceleration regeneration or backward movement described later. The engagement force of the hydraulic brakes 60A and 60B exerted when the one-way clutch 50 is in the engaged state is set to be lower than that of the hydraulic brakes 60A and 60B exerted when the one-way clutch 50 is in the non-engaged state, thus reducing energy consumption for the engagement of the hydraulic brakes 60A and 60B. Moreover, also in this state, the oil in the line oil passage 75 is reduced in pressure through the orifice 85a via the first low pressure oil passage 76a and then supplied to the components 91 as mentioned above, thus lubricating and cooling the components 91.

Figure 16:
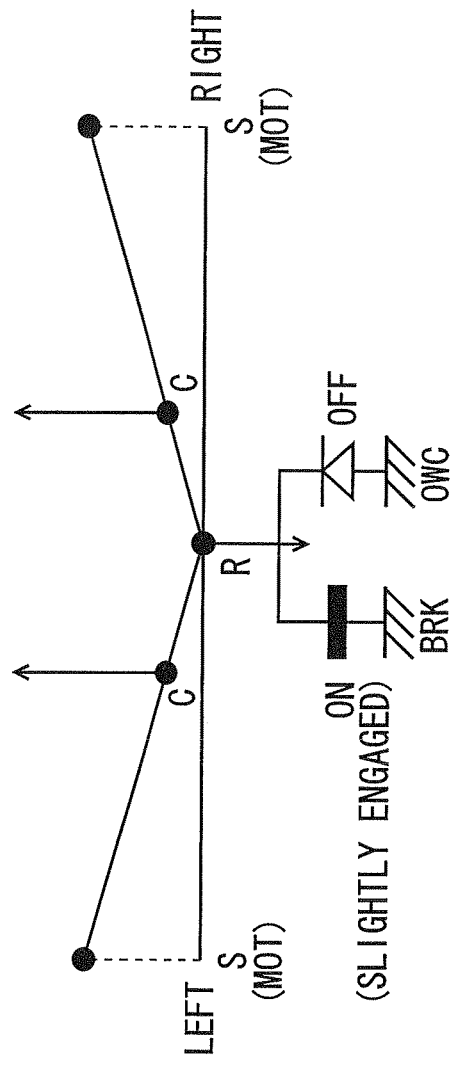
FIG. 16 is a speed collinear diagram of the rear wheel driving apparatus when the vehicle moves forward at an intermediate speed.

When the vehicle speed is increased and a shift is made from low speed forward traveling to intermediate speed forward traveling in which engine efficiency is high, a driving mode is changed from rear wheel driving performed by the rear wheel driving apparatus 1 to front wheel driving performed by the front wheel driving apparatus 6. As illustrated in FIG. 16, when power driving of the motors 2A and 2B is stopped, a forward torque, which will cause the vehicle to travel forward, is exerted on the planetary carriers 23A and 23B from the vehicle axles 10A and 10B, and therefore, the one-way clutch 50 enters the non-engaged state as mentioned above.

In this case, in the hydraulic circuit 71, the electrically-operated oil pump 70 runs in the low pressure mode (Lo), the solenoid 174 of the solenoid valve 83 is not energized (OFF), and the hydraulic brakes 60A and 60B are in the slightly engaged state as illustrated in FIG. 10. As mentioned above, when forward rotation power from the rear wheels Wr is inputted to the motors 2A and 2B, the one-way clutch 50 enters the non-engaged state, and thus power transmission cannot be performed by means of the one-way clutch 50 alone. However, the hydraulic brakes 60A and 60B provided in parallel with the one-way clutch 50 are slightly engaged, and the motors 2A and 2B and the rear wheels Wr are put in the connected state; thus, the motors 2A and 2B and the rear wheels Wr can be maintained in a power transmittable state, and rotational frequency control is unnecessary in making a shift to deceleration regeneration described later. Note that the engagement force of the hydraulic brakes 60A and 60B in this case is also lower than that of the hydraulic brakes 60A and 60B at the time of deceleration regeneration or backward movement described later. Moreover, also in this state, the oil in the line oil passage 75 is reduced in pressure through the orifice 85a via the first low pressure oil passage 76a and then supplied to the components 91 as mentioned above, thus lubricating and cooling the components 91.

Figure 17:
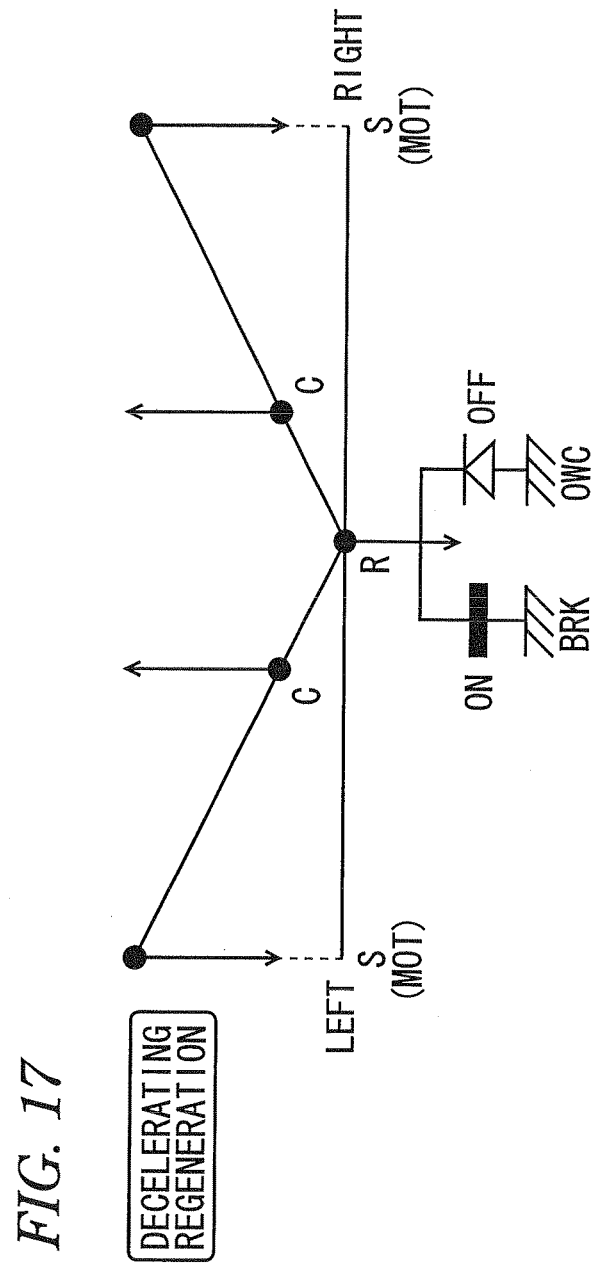
FIG. 17 is a speed collinear diagram of the rear wheel driving apparatus at the time of deceleration regeneration.

As illustrated in FIG. 17, when regeneration driving of the motors 2A and 2B will be carried out from the state illustrated in FIG. 15 or 16, a forward torque, which will cause the vehicle to continue traveling forward, is exerted on the planetary carriers 23A and 23B from the vehicle axles 10A and 10B, and the one-way clutch 50 enters the non-engaged state as mentioned above.

In this case, in the hydraulic circuit 71, the electrically-operated oil pump 70 runs in the high pressure mode (Hi), the solenoid 174 of the solenoid valve 83 is not energized (OFF), and the hydraulic brakes 60A and 60B are in the engaged state (ON) as illustrated in FIG. 11. Accordingly, the ring gears 24A and 24B are fixed, and a regeneration braking torque is exerted on each of the motors 2A and 2B in the reverse direction, thereby performing deceleration regeneration by the motors 2A and 2B. As mentioned above, when forward rotation power from the rear wheels Wr is inputted to the motors 2A and 2B, the one-way clutch 50 enters the non-engaged state, and thus power transmission cannot be performed by means of the one-way clutch 50 alone. However, the hydraulic brakes 60A and 60B provided in parallel with the one-way clutch 50 are engaged, and the motors 2A and 2B and the rear wheels Wr are put in the connected state, thereby allowing the motors 2A and 2B and the rear wheels Wr to be maintained in the power transmittable state. In this state, the motors 2A and 2B are each controlled so as to be in a regeneration driving state, thereby enabling regeneration of energy of the vehicle 3. Moreover, in this state, the oil in the line oil passage 75 is reduced in pressure through the orifice 85b via the second low pressure oil passage 76b and then supplied to the components 91 as mentioned above, thus lubricating and cooling the components 91.

Subsequently, at the time of acceleration, four-wheel driving is performed by the front wheel driving apparatus 6 and the rear wheel driving apparatus 1. In this case, the rear wheel driving apparatus 1 is in the same state as the rear wheel driving apparatus 1 at the time of low speed forward movement illustrated in FIG. 15, and the hydraulic circuit 71 is also in the state illustrated in FIG. 10.

Figure 18:
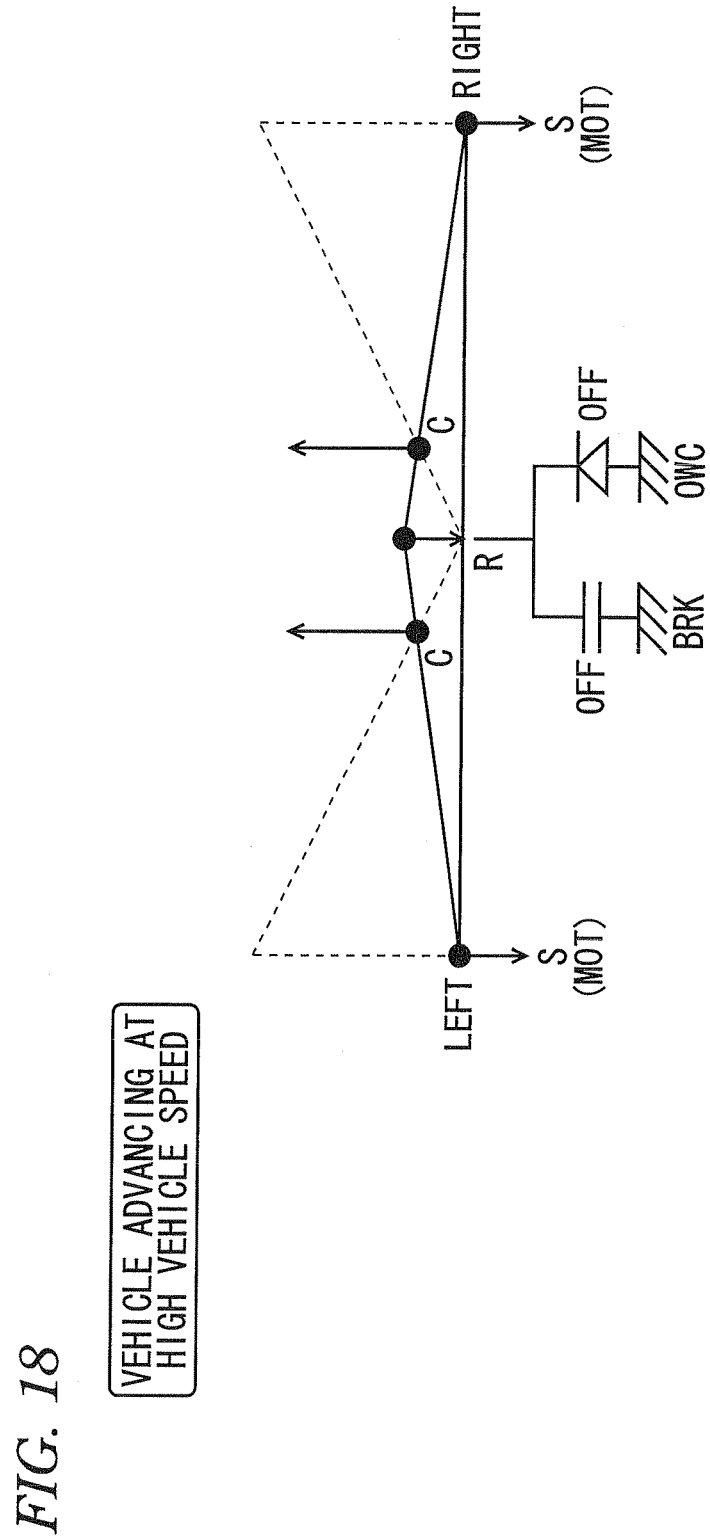
FIG. 18 is a speed collinear diagram of the rear wheel driving apparatus when the vehicle moves forward at a high speed.

At the time of high speed forward movement, front wheel driving is performed by the front wheel driving apparatus 6. As illustrated in FIG. 18, when power driving of the motors 2A and 2B is stopped, a forward torque, which will cause the vehicle to travel forward, is exerted on the planetary carriers 23A and 23B from the vehicle axles 10A and 10B, and therefore, the one-way clutch 50 enters the non-engaged state as mentioned above.

In this case, in the hydraulic circuit 71, the electrically-operated oil pump 70 runs in the low pressure mode (Lo), the solenoid 174 of the solenoid valve 83 is energized (ON), and the hydraulic brakes 60A and 60B are in the released state (OFF) as illustrated in FIG. 9. Accordingly, drag of the motors 2A and 2B is prevented, and the motors 2A and 2B are prevented from being excessively rotated at the time of high speed movement by the front wheel driving apparatus 6. Moreover, in this state, the oil in the line oil passage 75 is reduced in pressure through the orifice 85a via the first low pressure oil passage 76a and then supplied to the components 91 as mentioned above, thus lubricating and cooling the components 91.

Figure 19:
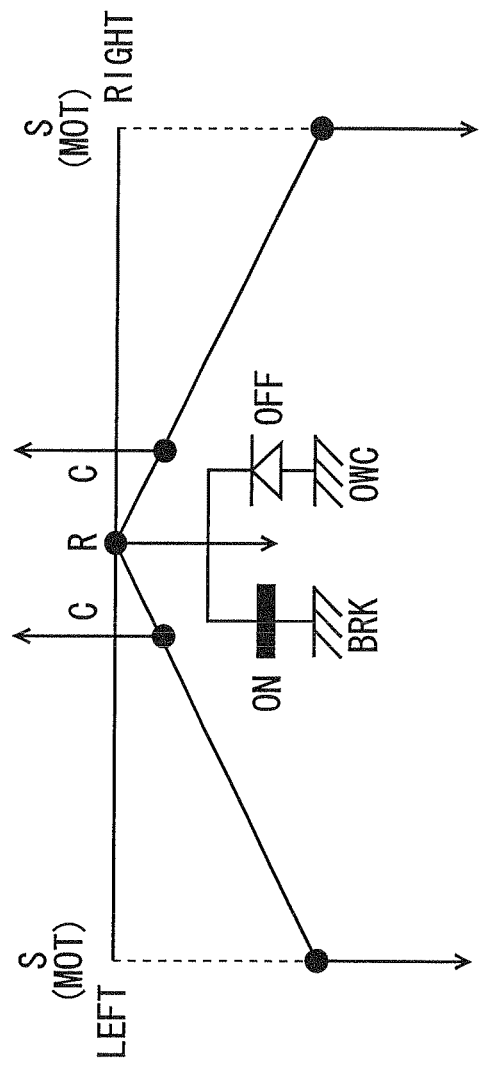
FIG. 19 is a speed collinear diagram of the rear wheel driving apparatus when the vehicle moves backward.

At the time of backward movement, as illustrated in FIG. 19, a reverse torque is applied to the sun gears 21A and 21B upon reverse power driving of the motors 2A and 2B. In this case, the one-way clutch 50 enters the non-engaged state as mentioned above.

In this case, in the hydraulic circuit 71, the electrically-operated oil pump 70 runs in the high pressure mode (Hi), the solenoid 174 of the solenoid valve 83 is not energized (OFF), and the hydraulic brakes 60A and 60B are in the engaged state as illustrated in FIG. 11. Accordingly, the ring gears 24A and 24B are fixed, and the planetary carriers 23A and 23B are rotated in the reverse direction to cause the vehicle to travel backward. Note that traveling resistance is exerted on the planetary carriers 23A and 23B from the vehicle axles 10A and 10B in the forward direction. As mentioned above, when reverse rotation power from the motors 2A and 2B is inputted to the rear wheels Wr, the one-way clutch 50 enters the non-engaged state, and thus power transmission cannot be performed by means of the one-way clutch 50 alone. However, the hydraulic brakes 60A and 60B provided in parallel with the one-way clutch 50 are engaged, and the motors 2A and 2B and the rear wheels Wr are put in the connected state; thus, the motors 2A and 2B and the rear wheels Wr can be maintained in the power transmittable state, and the vehicle 3 can be moved backward by the rotation power of the motors 2A and 2B. Moreover, in this state, the oil in the line oil passage 75 is reduced in pressure through the orifice 85b via the second low pressure oil passage 76b and then supplied to the components 91 as mentioned above, thus lubricating and cooling the components 91.

As described above, in the rear wheel driving apparatus 1, the engagement and release of hydraulic brakes 60A and 60B are controlled in accordance with the traveling state of the vehicle 3, i.e., in accordance with whether the rotation direction of the motors 2A and 2B is the forward direction or the reverse direction and whether power is inputted from the motors 2A and 2B or the rear wheels Wr; furthermore, even when the hydraulic brakes 60A and 60B are engaged, the engagement force is adjusted.

The above description has been made on the assumption that the vehicle travels straight, i.e., on the assumption that there is no rotation difference between the left motor 2A and the right motor 2B. Next, referring to FIGS. 20A to 20D and FIG. 21, control performed during vehicle traveling will be described on the assumption that the vehicle 3 makes a turn, i.e., on the assumption that there is a rotation difference between the left motor 2A and the right motor 2B.

Figure 20:
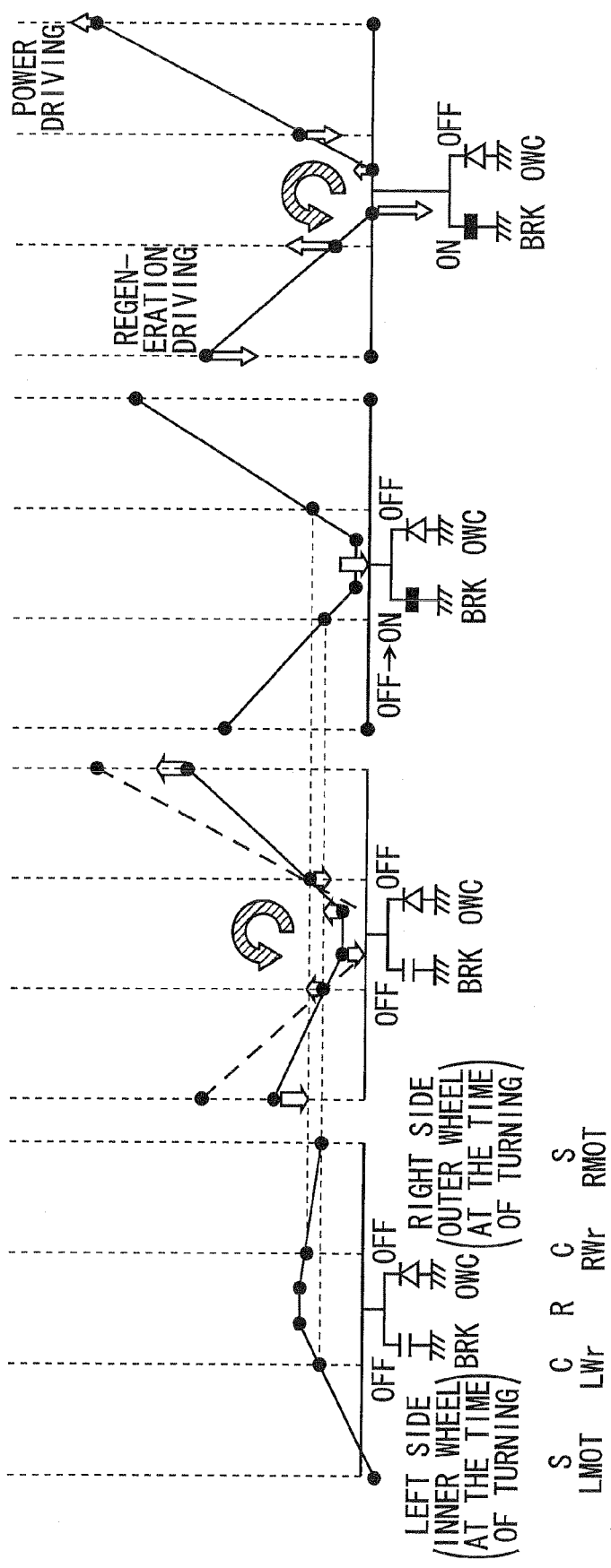
FIGS. 20A to 20D are speed collinear diagrams for describing control performed during vehicle turning.

FIG. 20A is a speed collinear diagram when the vehicle 3 makes a left turn during traveling by front wheel driving carried out by the front wheel driving apparatus 6. In this state, the hydraulic brakes 60A and 60B are released, the motor 2A for driving the left rear wheel LWr is rotated in the reverse direction, and the motor 2B for driving the right rear wheel RWr is rotated in the forward direction. The following description will be made on the assumption that regeneration driving of the motor 2A for driving the left rear wheel LWr is performed by utilizing a rotation difference between the right and left rear wheels RWr and LWr, and power driving of the motor 2B for driving the right rear wheel RWr is performed.

In order to perform regeneration driving of the motor 2A for driving the left rear wheel LWr by utilizing a rotation difference between the right and left rear wheels RWr and LWr and perform power driving of the motor 2B for driving the right rear wheel RWr, the hydraulic brakes 60A and 60B have to be engaged. Note that when an absolute value of a powering torque of the motor 2B is greater than that of a regeneration torque of the motor 2A after the fixation of the ring gears 24A and 24B, the one-way clutch 50 is engaged, and therefore, the hydraulic brakes 60A and 60B do not have to be engaged. However, the following description will be made on the assumption that an absolute value of a powering torque of the motor 2B is smaller than that of a regeneration torque of the motor 2A after the fixation of the ring gears 24A and 24B, and the hydraulic brakes 60A and 60B are engaged.

When hydraulic brake engagement requirements are satisfied based on a vehicle speed, a steering angle, etc., the control device 8 performs rotation control for reducing rotational frequencies of the connected ring gears 24A and 24B to about zero so that the rotational frequencies of the connected ring gears 24A and 24B can be absorbed by the hydraulic brakes 60A and 60B. Therefore, as illustrated in FIG. 20B, driving control (rotational frequency control) is performed on one of the motors (i.e., the motor 2B for the right rear wheel RWr serving as an outer wheel in the present embodiment) so that a target rotational frequency is achieved, and no driving control is performed on the other motor (i.e., the motor 2A for the left rear wheel LWr serving as an inner wheel in the present embodiment).

In this case, a powering torque is exerted on the sun gear 21B for the right rear wheel RWr in the forward direction, and frictional force and inertial force of the sun gear 21A are exerted on the sun gear 21A for the left rear wheel LWr in the reverse direction. Further, a surface resistance from the right rear wheel RWr is exerted on the planetary carrier 23B for the right rear wheel RWr in the reverse direction, and a traveling torque from the left rear wheel LWr is exerted on the planetary carrier 23A for the left rear wheel LWr in the forward direction. Frictional forces and inertial forces of the ring gears 24A and 24B are exerted on the ring gears 24A and 24B. In this state, a counterclockwise yawing moment indicated by the hatched arrow in FIG. 20B is generated in the vehicle 3. Then, the rotational frequency of the motor 2B, on which driving control is performed, is brought close to the target rotational frequency, and thus the rotational frequencies of the ring gears 24A and 24B are reduced and brought close to about zero, so that rotation adjustment is completed. At this point, the hydraulic brakes 60A and 60B are engaged, thereby fixing the ring gears 24A and 24B (FIG. 20C). Then, regeneration driving of the motor 2A for the left rear wheel LWr, serving as an inner wheel at the time of left turning, is performed, and power driving of the motor 2B for the right rear wheel RWr, serving as an outer wheel at the time of left turning, is performed (FIG. 20D), thus enabling regeneration by one of the motors, i.e., the motor 2A, by utilizing a rotation difference between the right and left wheels at the time of vehicle turning. Also in this case, a yawing moment whose direction is the same as that of the yawing moment generated during rotation adjustment, i.e., a counterclockwise yawing moment indicated by the hatched arrow in FIG. 20D, is exerted on the vehicle 3.

Figure 21:
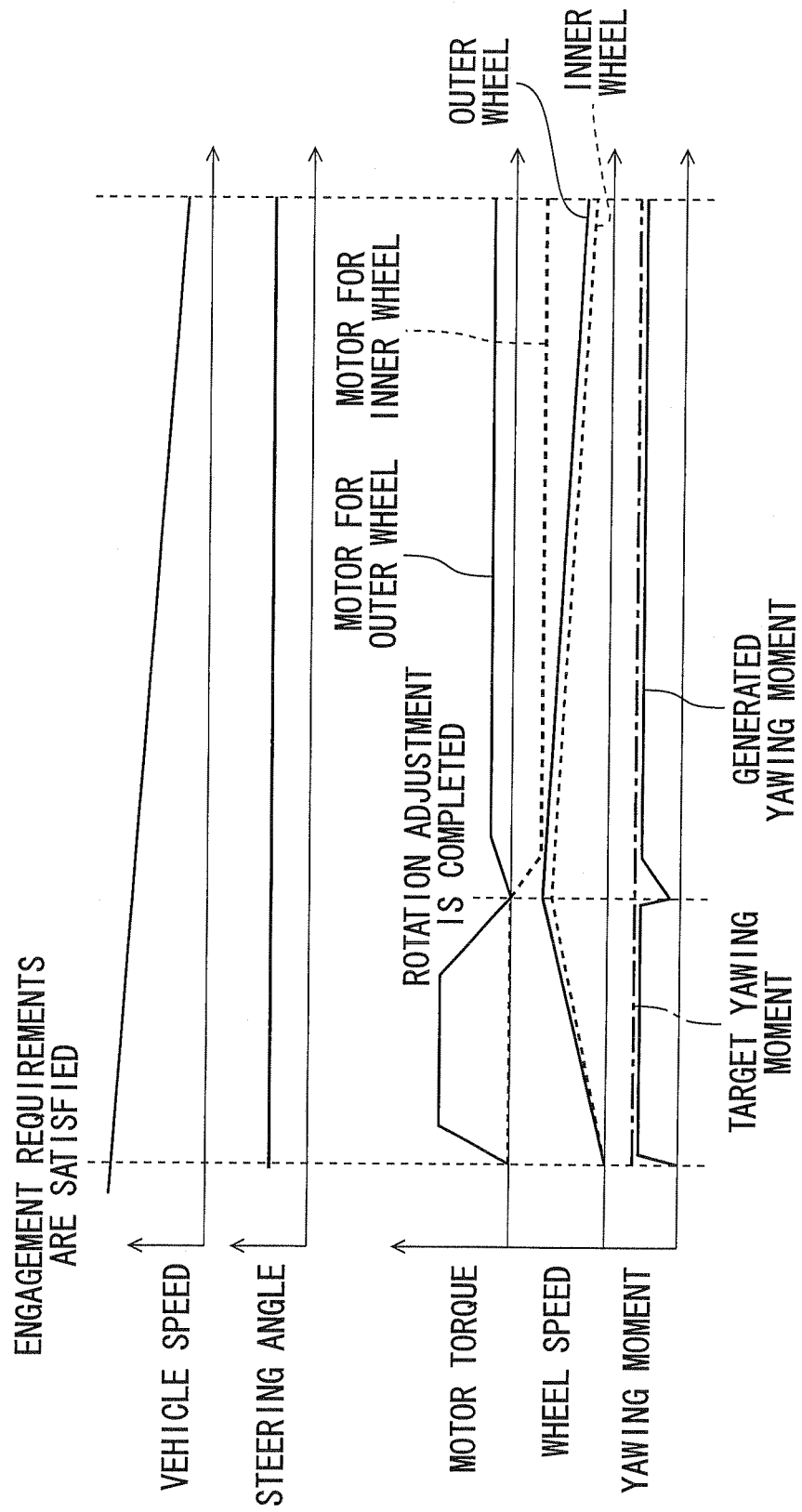
FIG. 21 is a timing chart during vehicle turning.
Figure 22:
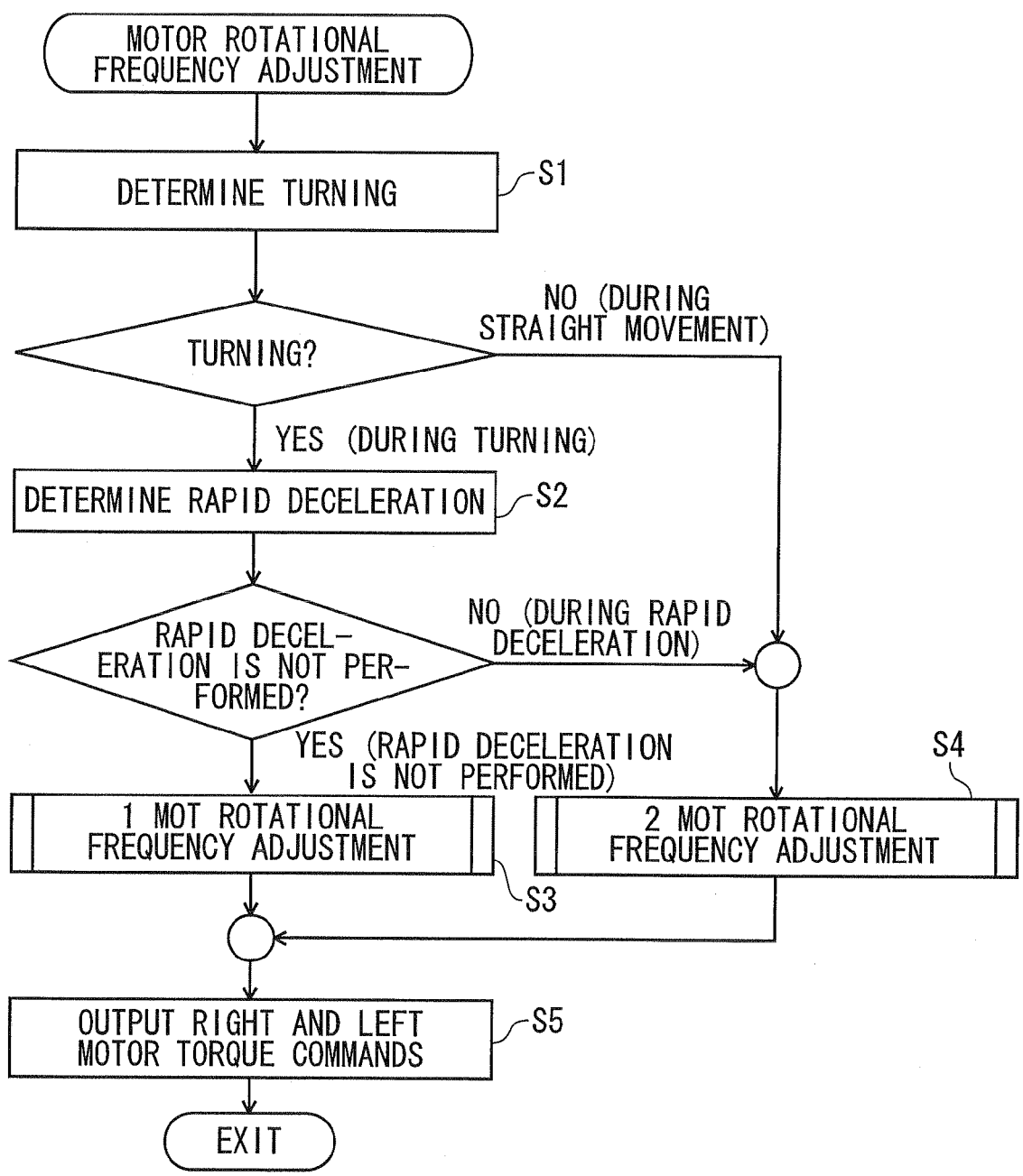
FIG. 22 is a flow chart describing rotational frequency control.

In the above-described control, the yawing moment is generated as illustrated in FIG. 21 during rotation control for the ring gears 24A and 24B for engagement of the hydraulic brakes 60A and 60B, i.e., during a period between a time at which requirements for engagement of the hydraulic brakes 60A and 60B are satisfied and a time at which the rotation adjustment is completed.

As described above, according to the present embodiment, when the rotations of the connected ring gears 24A and 24B are controlled during turning of the vehicle 3, driving control is performed on only one of the motors, thereby enabling generation of a yawing moment. Moreover, as compared with a case where driving control is performed on both of the motors 2A and 2B, the number of objects to be controlled is reduced, thus enhancing controllability and enabling a reduction in energy consumption. Further, during turning of the vehicle 3, driving control is performed on the motor for the wheel serving as an outer wheel at the time of turning, thereby making it possible to enhance operability of the vehicle 3 at the time of turning.

Note that the rotational frequency of the motor 2B for the wheel, serving as an outer wheel at the time of left turning, is controlled in the foregoing embodiment, but the rotational frequency of the motor 2A for the wheel serving as an inner wheel may alternatively be controlled. However, in that case, the direction of the generated yawing moment is different. Furthermore, the hydraulic brakes 60A and 60B do not necessarily have to be engaged, and the present invention may also be applied to control for engaging the one-way clutch 50. In other words, when an absolute value of a powering torque of one of the motors is greater than that of a regeneration torque of the other motor, driving control is performed on either one of the motors so that the rotational frequency of the controlled motor is brought close to the target rotational frequency; thus, the rotations of the ring gears 24A and 24B are brought to zero, and the one-way clutch 50 is engaged, thereby enabling generation of a yawing moment until rotation adjustment is completed.

Hereinafter, a control flow in the foregoing embodiment will be described with reference to FIGS. 22 to 26.

Figure 23:
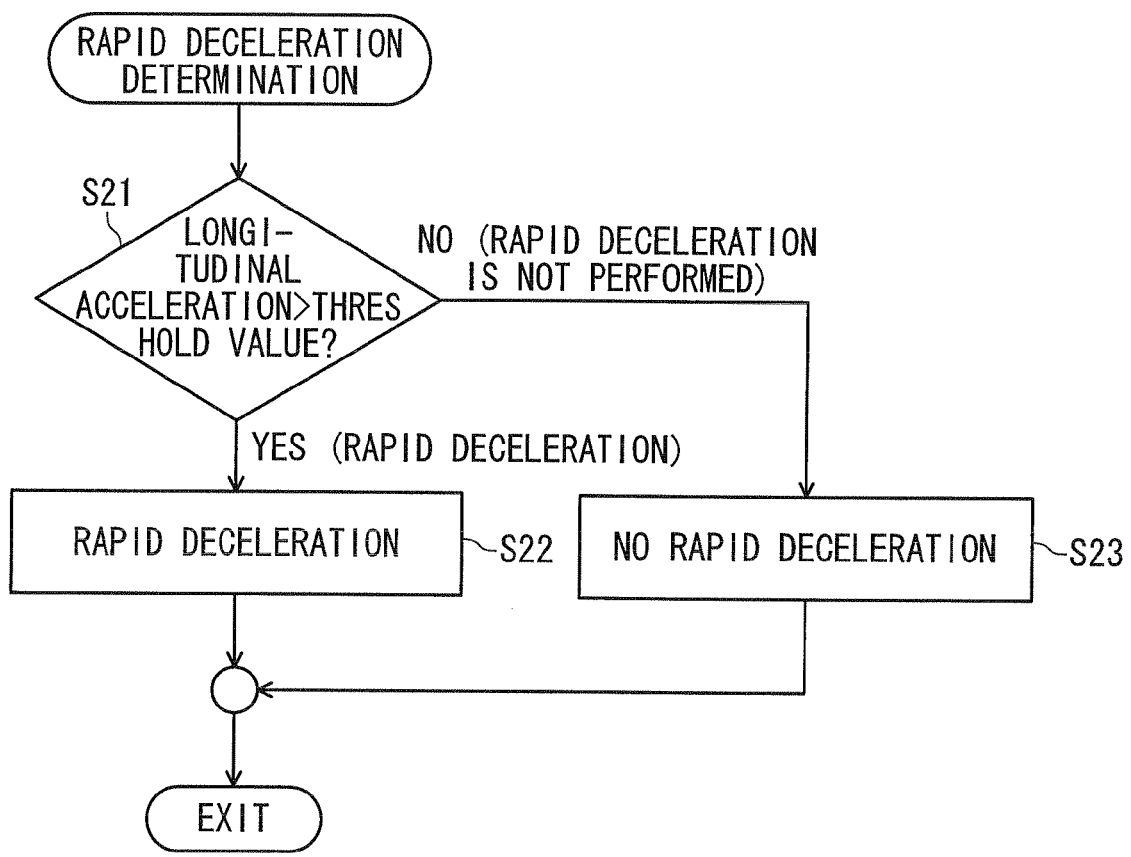
FIG. 23 is a flow chart describing a rapid deceleration determination process.
Figure 24:
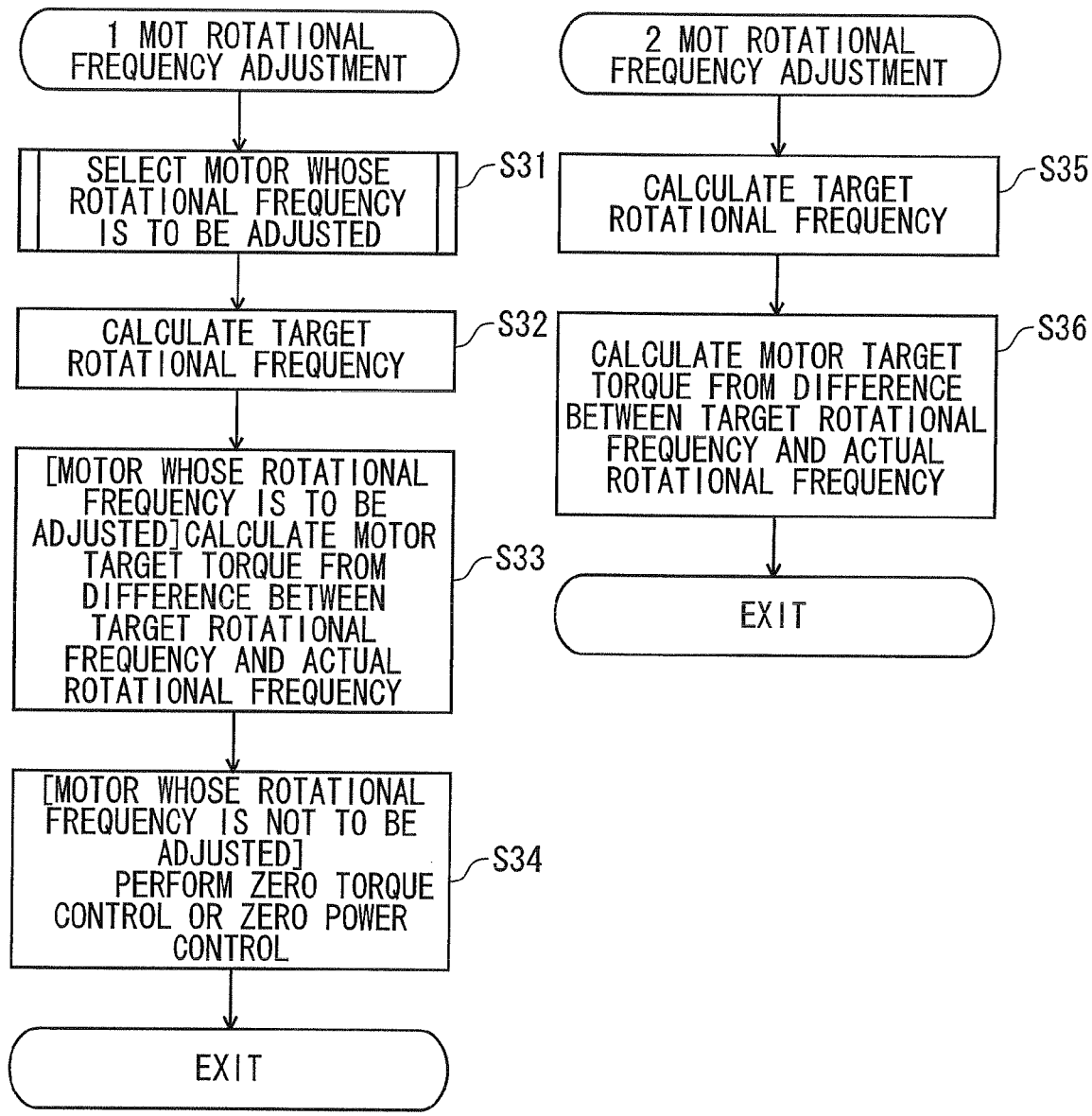
FIG. 24A is a flow chart describing a process for adjusting a rotational frequency of one motor.
FIG. 24B is a flow chart describing a process for adjusting rotational frequencies of two motors.

In the present embodiment, turning is first determined (S1). In Step S1, whether or not the vehicle 3 is making a turn is determined based on a difference between rotational frequencies of the right and left rear wheels RWr and LWr, a steering angle, etc. Then, upon determination that the vehicle 3 is not making a turn, i.e., upon determination that the vehicle 3 is moving straight, the control flows proceeds to a 2 MOT rotational frequency adjusting process (S4). On the other hand, upon determination that the vehicle 3 is making a turn, rapid deceleration determination is subsequently made (S2). In Step S2, a throttle opening or a brake pedal force is detected to determine whether or not longitudinal acceleration is higher than a given threshold value (S21) as illustrated in FIG. 23. Then, when the longitudinal acceleration is higher than the given threshold value, rapid deceleration is determined (S22); on the other hand, when the longitudinal acceleration is equal to or lower than the given threshold value, no rapid deceleration is determined (S23). Note that rapid deceleration may be determined based on a brake pedal force.

When no rapid deceleration is determined in Step S2 (S23), the control flow proceeds to a 1 MOT rotational frequency adjusting process (S3). On the other hand, when rapid deceleration is determined (S22), the control flow proceeds to the 2 MOT rotational frequency adjusting process (S4). In the 1 MOT rotational frequency adjusting process, driving control is performed on only one of the motors 2A and 2B to carry out rotation adjustment of the motor, thus controlling the rotations of the ring gears 24A and 24B. Furthermore, in the 2 MOT rotational frequency adjusting process, driving control is performed on both of the motors 2A and 2B to adjust the rotational frequencies of both of the motors, thus controlling the rotations of the ring gears 24A and 24B.

Figure 25:
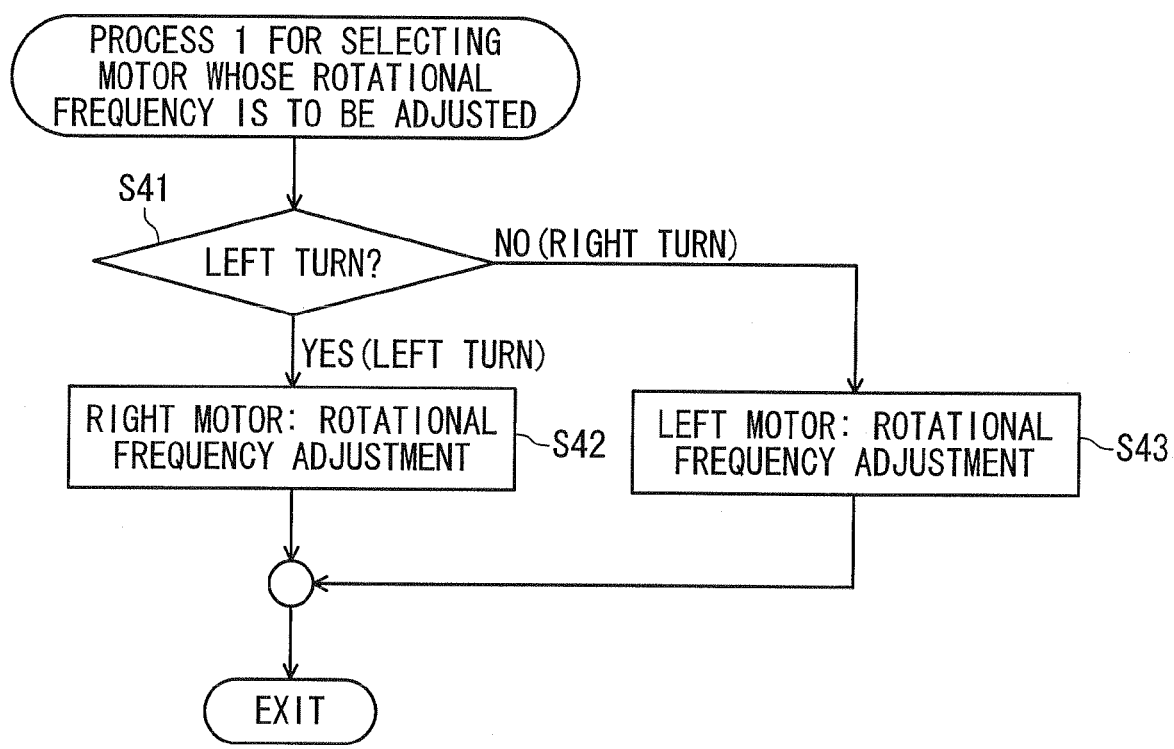
FIG. 25 is a flow chart describing a process for selecting the motor whose rotational frequency is to be adjusted.
Figure 26:
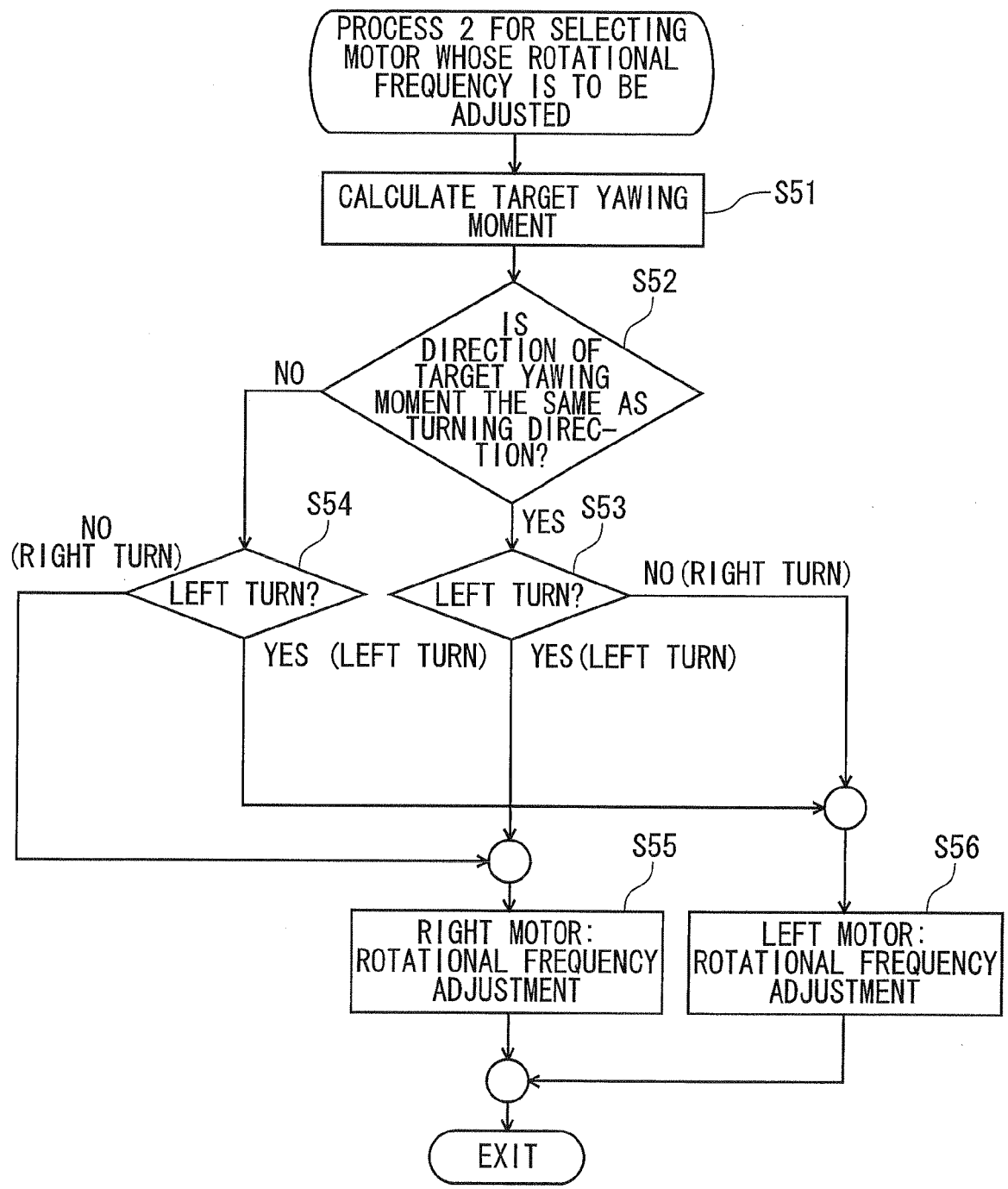
FIG. 26 is a flow chart describing a variation of the process for selecting the motor whose rotational frequency is to be adjusted.
Figure 27:
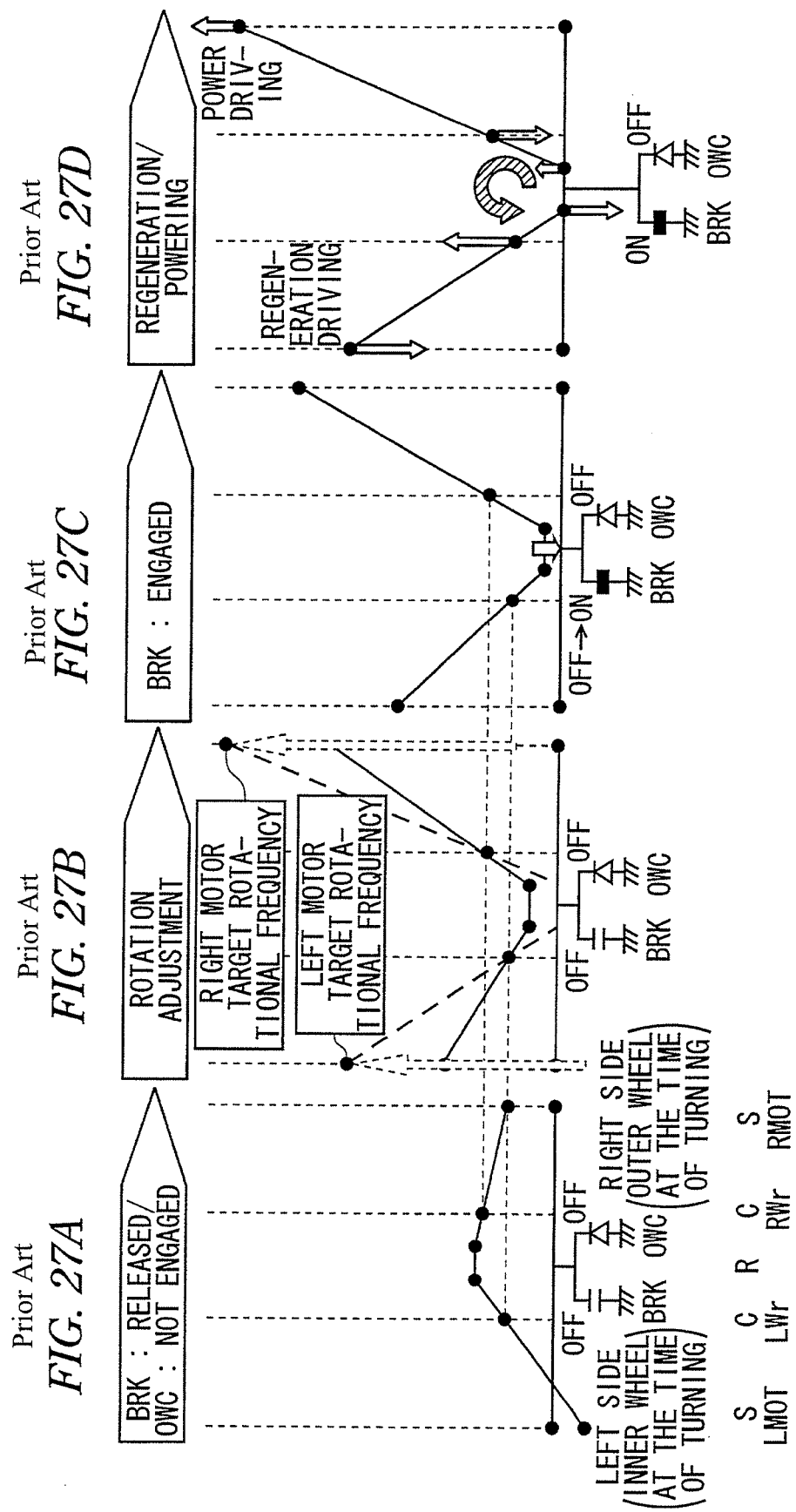
FIGS. 27A to 27D are speed collinear diagrams for describing control performed during vehicle turning, which is disclosed in WO 2011/013829.
Figure 28:
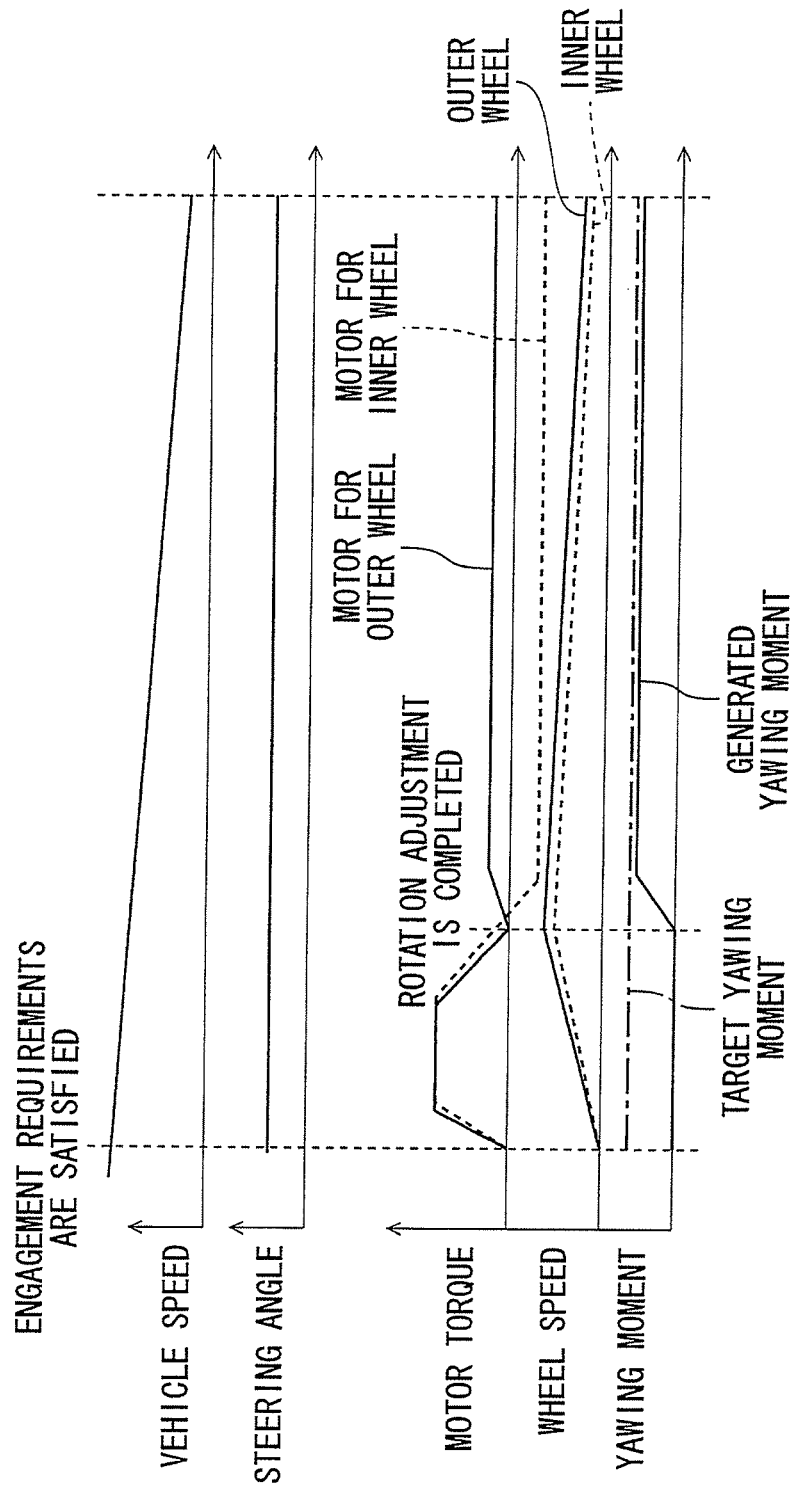
FIG. 28 is a timing chart during vehicle turning, which is disclosed in WO 2011/013829.

In the 1 MOT rotational frequency adjusting process (S3), a rotational frequency adjustment motor selecting process (S31) for selecting the motor whose rotational frequency is to be adjusted is first performed as illustrated in FIG. 24A. In the rotational frequency adjustment motor selecting process (S31), a turning direction is decided based on a difference between rotational frequencies of the right and left rear wheels RWr and LWr, a steering angle, etc., thus determining whether or not a left turn is made (S41) as illustrated in FIG. 25. Then, upon determination that a left turn is made, the motor 2B (right motor) for the right rear wheel RWr is selected (S42); on the other hand, upon determination that no left turn is made, i.e., upon determination that a right turn is made, the motor 2A (left motor) for the left rear wheel LWr is selected (S43). As described above, since the motor for driving the wheel (outer wheel) serving as an outer wheel at the time of turning is selected, generation of a clockwise yawing moment is enabled when a right turn is made, and generation of a counterclockwise yawing moment is enabled when a left turn is made, thus making it possible to generate the yawing moment whose direction is the same as the turning direction. Accordingly, the generated yawing moment can assist the vehicle 3 to make the turn, thereby enhancing operability of the vehicle 3. Further, the motor for driving the wheel serving as an outer wheel at the time of turning is selected as described above; thus, at the same time, a yawing moment is generated in the same direction as that of a yawing moment generated after the engagement of the hydraulic brakes 60A and 60B. Hence, a difference between the yawing moment generated during rotational frequency control and the yawing moment generated after the engagement of the hydraulic brakes 60A and 60B can be reduced, and vehicle behavior can be prevented from being disturbed.

Referring again to FIG. 24A, after the motor whose rotational frequency is to be adjusted has been selected in the rotational frequency adjustment motor selecting process (S31), a target rotational frequency of the motor is calculated (S32). Subsequently, for the motor whose rotational frequency is to be adjusted, a motor target torque is calculated from a difference between the target rotational frequency and an actual rotational frequency of the motor whose rotational frequency is to be adjusted (S33); on the other hand, for the motor whose rotational frequency is not to be adjusted, zero torque control or zero power control is performed (S34).

As illustrated in FIG. 24B, in the 2 MOT rotational frequency adjusting process (S4), target rotational frequencies of the motors 2A and 2B are calculated (S35). Subsequently, motor target torques are calculated from differences between the target rotational frequencies and actual rotational frequencies of the motors 2A and 2B (S36).

Referring again to FIG. 22, after the 1 MOT rotational frequency adjusting process (S3) or the 2 MOT rotational frequency adjusting process (S4) has been finished, motor torque command values are outputted to the left motor 2A and the right motor 2B (S5).

Thus, in the case of the 1 MOT rotational frequency adjusting process (S3), the rotations of the ring gears 24A and 24B can be controlled while a yawing moment is generated as described with reference to FIGS. 20A to 20D and FIG. 21; on the other hand, in the case of the 2 MOT rotational frequency adjusting process (S4), the rotations of the ring gears 24A and 24B can be controlled while no yawing moment is generated as described with reference to FIGS. 27A to 27D and FIG. 28.

According to the foregoing embodiment, in the rotational frequency adjustment motor selecting process (S31), control is performed in a uniform manner so that the motor 2B (right motor) for the right rear wheel RWr is selected (S42) when a left turn is made, and the motor 2A (left motor) for the left rear wheel LWr is selected (S43) when a right turn is made. However, the present invention is not necessarily limited to such control. Alternatively, the rotational frequency adjustment motor selecting process may be performed as described in a variation illustrated in FIG. 26.

First, a target yawing moment is calculated (S51). Subsequently, whether or not a direction of the target yawing moment is the same as a turning direction is detected (S52). Then, upon detection that the direction of the target yawing moment is the same as the turning direction, whether or not a left turn is made is detected (S53). Upon detection that a left turn is made, the motor 2B (right motor) for the right rear wheel RWr is selected (S55); on the other hand, upon detection that no left turn is made, i.e., upon detection that a right turn is made, the motor 2A (left motor) for the left rear wheel LWr is selected (S56). In other words, when the direction of the target yawing moment is the same as the turning direction, the motor is selected similarly to the rotational frequency adjustment motor selecting process described with reference to FIG. 25; hence, when a right turn is made, a clockwise yawing moment is generated so as to assist the vehicle in making the turn, and when a left turn is made, a counterclockwise yawing moment is generated so as to assist the vehicle in making the turn.

As described above, one of the motors 2A and 2B, on which driving control is to be performed, is selected based on the target yawing moment so that a yawing moment is generated in the same direction as that of the target yawing moment, thus making it possible to suitably generate the yawing moment, to assist the vehicle in making a turn, and to enhance operability of the vehicle at the time of turning.

On the other hand, when it is detected in Step S52 that the direction of the target yawing moment is not the same as the turning direction, i.e., when the direction of the target yawing moment is different from the turning direction, whether or not a left turn is made is detected (S54). Upon detection that a left turn is made, the motor 2A (left motor) for the left rear wheel LWr is selected (S56); on the other hand, upon detection that no left turn is made, i.e., upon detection that a right turn is made, the motor 2B (right motor) for the right rear wheel RWr is selected (S55). The case where the direction of the target yawing moment is different from the turning direction means a case where the vehicle 3 is oversteered, for example. In such a case, a yawing moment is generated in the direction opposite to the normal direction, thereby making it possible to correct a disturbed behavior of the vehicle 3.

As described thus far, according to the present embodiment, when rotation control for controlling the rotations of the connected ring gears 24A and 24B to target rotations is carried out, driving control is performed on only one of the motors 2A and 2B to control the rotations of the ring gears 24A and 24B, and therefore, generation of a yawing moment is enabled when the rotations of the ring gears 24A and 24B are controlled. Further, as compared with the case where driving control is performed on both of the motors 2A and 2B, the number of objects to be controlled is reduced, thus enhancing controllability and enabling a reduction in energy consumption. Note that the ring gears 24A and 24B do not necessarily have to be connected. Alternatively, the sun gears 21A and 21B may be connected or the planetary carriers 23A and 23B may be connected in accordance with a mechanism, and rotational frequencies of the connected members may be controlled.

Furthermore, in accordance with the traveling state of the vehicle 3, the control device 8 suitably selects the 1 MOT rotational frequency adjusting process in which energy consumption is reduced and generation of a yawing moment is enabled, or the 2 MOT rotational frequency adjusting process in which rotational frequency control is carried out at an early stage, thus making it possible to achieve both of enhancement in traveling performance of the vehicle 3 and reduction in energy consumption.

Moreover, the 1 MOT rotational frequency adjusting process is performed at the time of turning, thereby enabling enhancement in operability of the vehicle at the time of turning. It is to be noted that at the time of rapid deceleration during turning, rotation adjustment can be performed at an early stage by the 2 MOT rotational frequency adjusting process, and an amount of regeneration can be increased. Besides, the 2 MOT rotational frequency adjusting process is performed at the time of straight movement, thereby making it possible to suppress generation of an unnecessary yawing moment. It is also to be noted that even during straight movement, the 1 MOT rotational frequency adjusting process may be performed as necessary when a yawing moment is preferably generated, for example.

Further, the 1 MOT rotational frequency adjusting process does not necessarily have to be performed at the time of turning. For example, a threshold value may be provided for the amount of turning, magnitude of a target yawing moment, magnitude of a steering angle or the like, and when the threshold value is reached or exceeded, the 1 MOT rotational frequency adjusting process may be performed.

Figure 29:
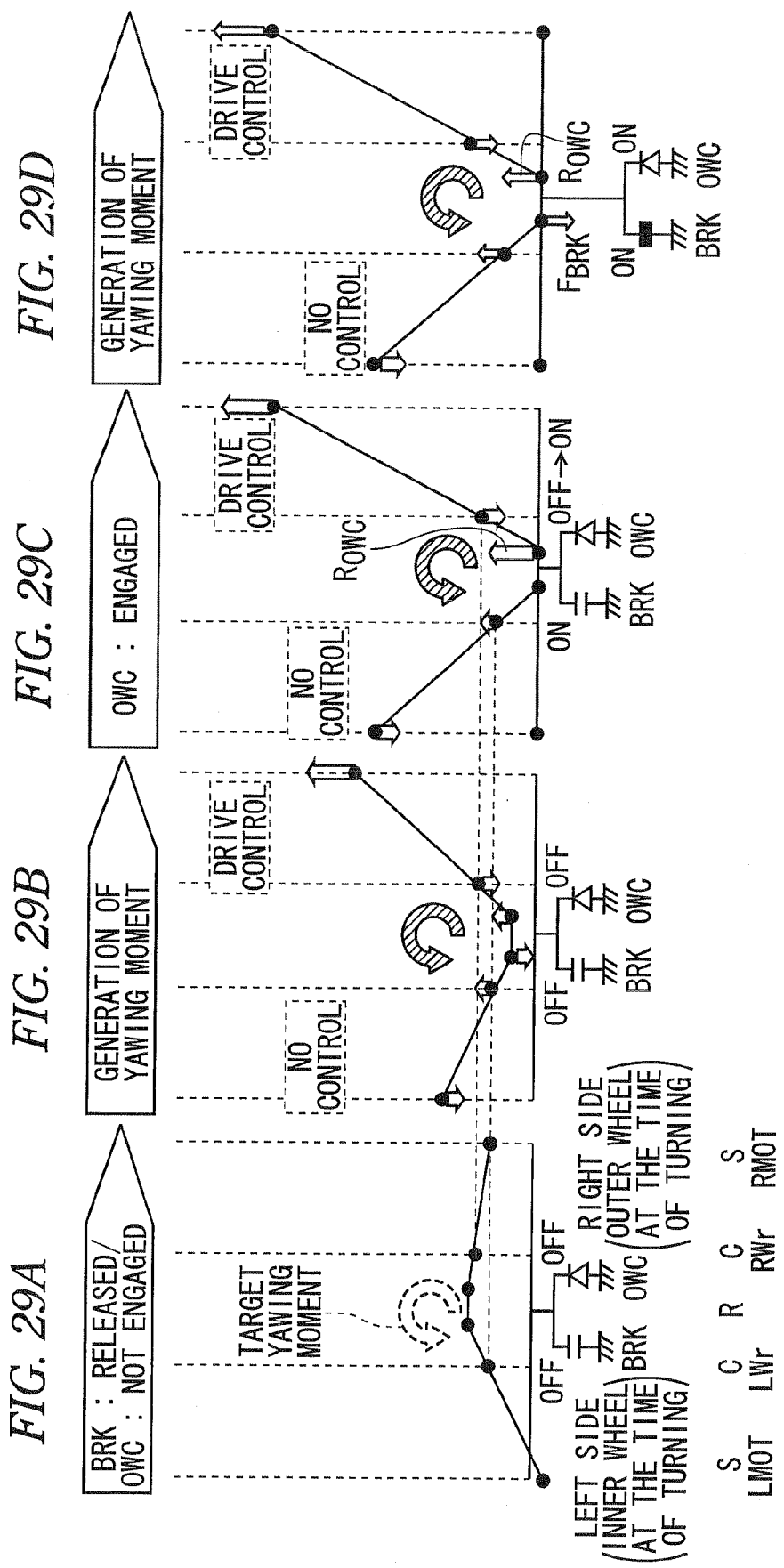
FIGS. 29A to 29D are speed collinear diagrams for describing control performed during vehicle turning.

FIG. 29A is a speed collinear diagram when the vehicle 3 makes a left turn during traveling by front wheel driving carried out by the front wheel driving apparatus 6. In this state, the hydraulic brakes 60A and 60B are released, the motor 2A for driving the left rear wheel LWr is rotated in the reverse direction, and the motor 2B for driving the right rear wheel RWr is rotated in the forward direction.

In this state, in order to assist the vehicle 3 in making the turn (left turn in the present embodiment), the control device 8 performs driving control as follows. Based on the target yawing moment indicated by the dotted arrow in FIG. 29A, the control device 8 performs driving control only on the motor 2B so that the motor 2B for driving the right rear wheel RWr is rotated in the forward direction, or performs driving control only on the motor 2A so that the motor 2A for driving the left rear wheel LWr is rotated in the reverse direction. Note that instead of the target yawing moment, a target turning state amount such as a target yawing rate, a target lateral acceleration or a target skid angle may be used, or a turning state amount required by a driver, such as a vehicle steering angle or a required yawing moment, may be used.

FIG. 29B illustrates, by way of example, a speed collinear diagram when driving control is performed only on the motor 2B so that the motor 2B for driving the right rear wheel RWr is rotated in the forward direction. Power driving is performed so that the motor 2B is rotated in the forward direction; thus, a powering torque is exerted on the sun gear 21B for the right rear wheel RWr in the forward direction, and frictional force and inertial force of the sun gear 21A are exerted on the sun gear 21A for the left rear wheel LWr in the reverse direction. It is impossible to transmit the powering torque of the motor 2B to the right rear wheel RWr without loss, but the powering torque is partially transmitted to the right rear wheel RWr; thus, a surface resistance from the right rear wheel RWr is exerted on the planetary carrier 23B for the right rear wheel RWr in the reverse direction, and a traveling torque from the left rear wheel LWr is exerted on the planetary carrier 23A for the left rear wheel LWr in the forward direction. Frictional forces and inertial forces of the ring gears 24A and 24B are exerted on the ring gears 24A and 24B. In this state, a counterclockwise yawing moment, indicated by the hatched arrow in FIG. 29B, is generated in the vehicle 3.

As described above, during turning of the vehicle 3 by the front wheel driving apparatus 6, driving control is performed only on the motor (i.e., the motor 2B in the present embodiment) for driving one of the right and left rear wheels RWr and LWr (i.e., the right rear wheel RWr in the present embodiment) serving as an outer wheel at the time of turning, thereby making it possible to generate a yawing moment in the same direction as the turning direction of the vehicle 3 and to assist the vehicle 3 in making the turn.

The rotational frequency of the motor 2B is increased from this state, and when the rotational frequencies of the connected ring gears 24A and 24B have reached about zero, the one-way clutch 50 is engaged (FIG. 29C). Thus, a reaction force Rowe of the one-way clutch 50 is exerted on the ring gears 24A and 24B in the forward direction.

Even after the one-way clutch 50 has been engaged, driving control is performed only on the motor 2B, or more specifically, power driving is performed so that the motor 2B is rotated in the forward direction, thereby maintaining the counterclockwise yawing moment. In this case, the engagement of the hydraulic brakes 60A and 60B is optional, but FIG. 29D illustrates the case where the hydraulic brakes 60A and 60B are engaged. When the hydraulic brakes 60A and 60B are engaged, a braking force Fbrk of the hydraulic brakes 60A and 60B is exerted on the ring gears 24A and 24B in the reverse direction; thus, for example, even when the powering torque of the motor 2B is reduced and the reaction force Rowe of the one-way clutch 50 is reduced, the fixation (braking) of the ring gears 24A and 24B can be maintained with reliability.

Note that as mentioned above, in assisting the vehicle to make a turn, driving control may be performed only on the motor 2A so that the motor 2A for driving the left rear wheel LWr is rotated in the reverse direction, instead of performing driving control on the motor 2B so that the motor 2B for driving the right rear wheel RWr is rotated in the forward direction. However, when driving control is performed so that the motor 2A is rotated in the reverse direction, the rotational frequencies of the ring gears 24A and 24B are increased, thus making it impossible to engage the hydraulic brakes 60A and 60B. Therefore, in assisting the vehicle to make a turn, a direction in which a yawing moment is generated is preferably taken into consideration, and either one of the motors 2A and 2B is preferably selected so that the rotational frequencies of the ring gears 24A and 24B are reduced.

Further, the above-described control may be applied not only to the case where the vehicle 3 is making a turn, but also to the case where a behavior of the vehicle 3 is disturbed during straight movement of the vehicle 3 due to an influence of strong wind or the like, for example.

As described above, according to the present embodiment, driving control is performed on only one of the motors, thereby enabling generation of a yawing moment as a turning state amount of the vehicle 3. Thus, it is possible to assist the vehicle 3 in making a turn and to correct a disturbed behavior of the vehicle 3. Moreover, driving control is performed on only one of the motors so as to control a yawing moment; thus, as compared with the case where driving control is performed on both of the motors 2A and 2B, the number of objects to be controlled is reduced, thereby enhancing controllability and enabling a reduction in energy consumption.

Hereinafter, an example of a control flow for selecting the motor, on which driving control is to be performed, will be described with reference to FIG. 30.

Figure 30:
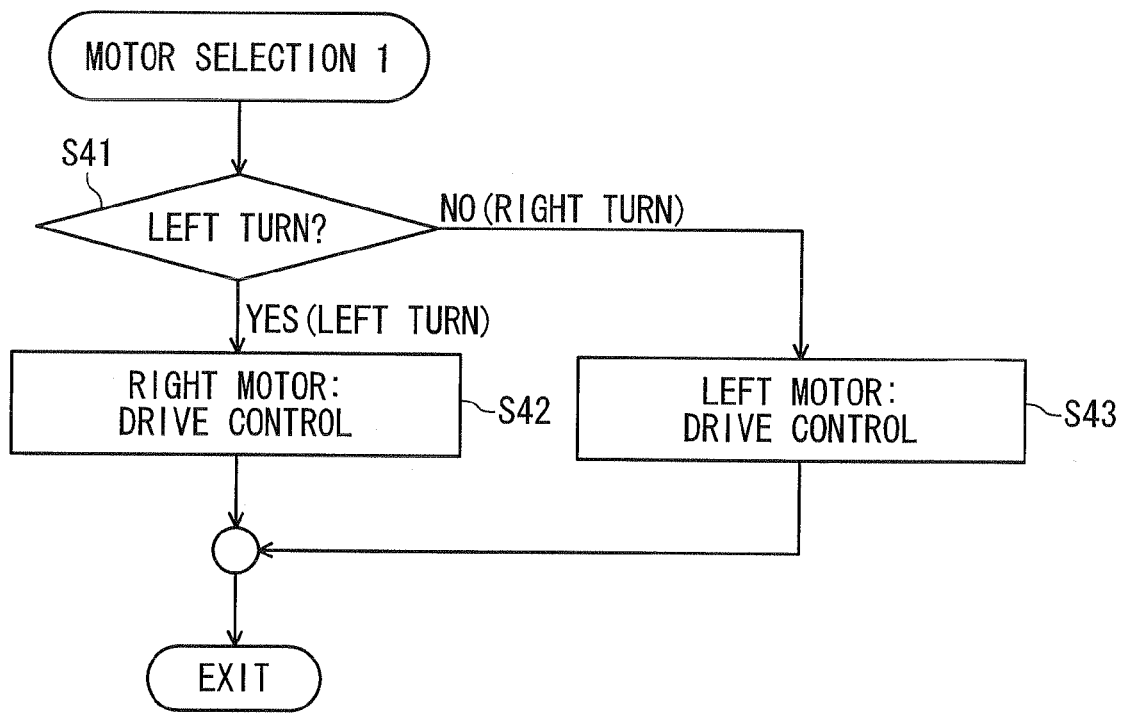
FIG. 30 is a flow chart illustrating an example of a control flow for selecting the motor on which driving control is to be performed.

In the present embodiment, as illustrated in FIG. 30, the motor 2A or 2B, on which driving control is to be performed, is decided based on a difference between the rotational frequencies of the right and left rear wheels RWr and LWr, a steering angle, etc. First, whether or not a left turn is made is determined (S41). Then, upon determination that a left turn is made, the motor 2B (right motor) for the right rear wheel RWr is selected (S42); on the other hand, upon determination that no left turn is made, i.e., upon determination that a right turn is made, the motor 2A (left motor) for the left rear wheel LWr is selected (S43). As described above, since the motor for driving the wheel (outer wheel) serving as an outer wheel at the time of turning is selected, generation of a clockwise yawing moment is enabled when a right turn is made, and generation of a counterclockwise yawing moment is enabled when a left turn is made, thus making it possible to generate the yawing moment whose direction is the same as the turning direction. Accordingly, the generated yawing moment can assist the vehicle 3 in making the turn, thereby enhancing operability of the vehicle 3. Further, the motor for driving the wheel serving as an outer wheel at the time of turning is selected as described above; thus, at the same time, a yawing moment is generated in the same direction as that of a yawing moment generated after the engagement of the hydraulic brakes 60A and 60B. Hence, a difference between the yawing moment generated before the engagement of the hydraulic brakes 60A and 60B and the yawing moment generated after the engagement of the hydraulic brakes 60A and 60B can be reduced, and vehicle behavior can be prevented from being disturbed.

Figure 31:
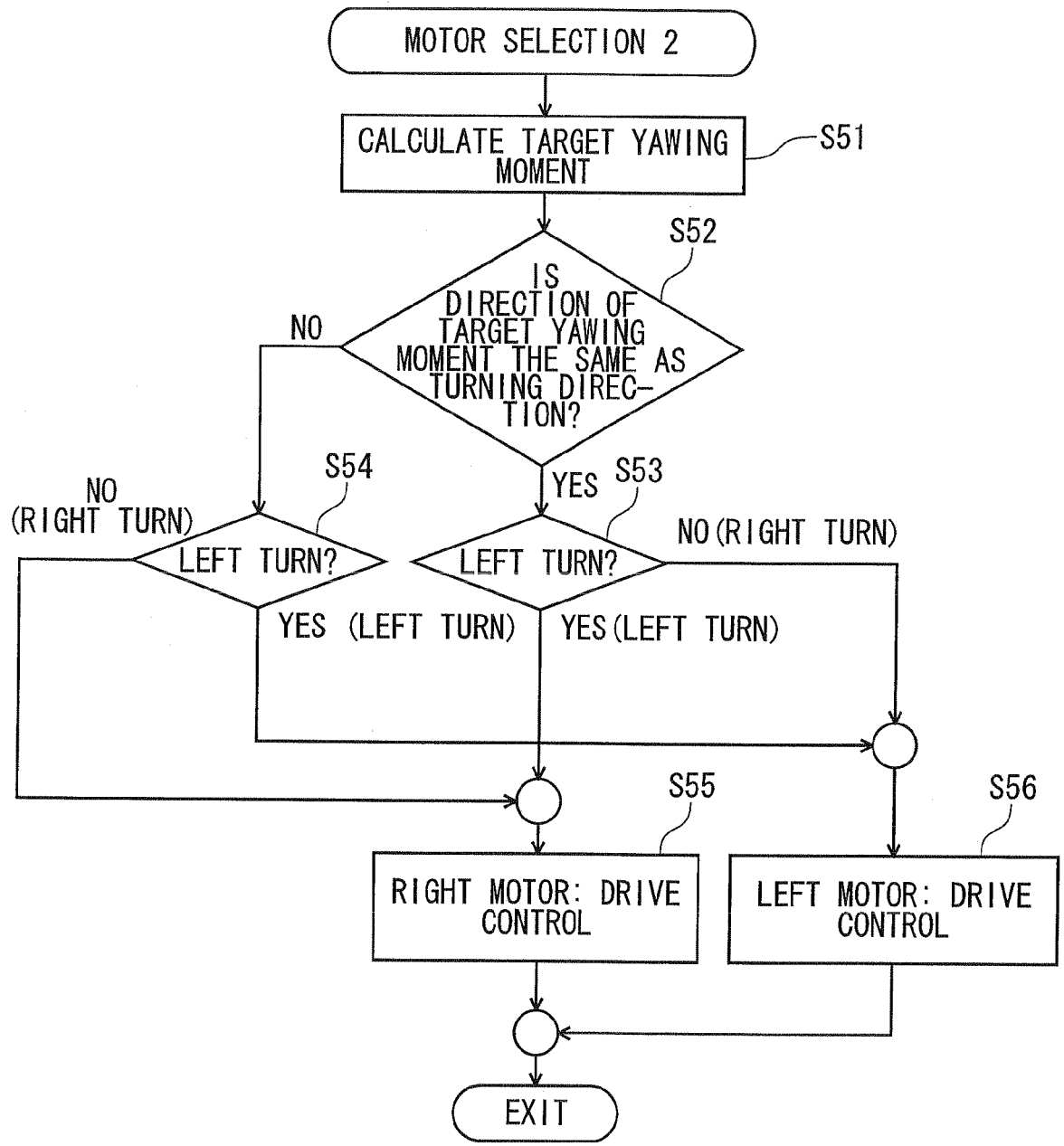
FIG. 31 is a flow chart illustrating another example of the control flow for selecting the motor on which driving control is to be performed.

In the above-described control flow, control is performed in a uniform manner so that the motor 2B (right motor) for the right rear wheel RWr is selected (S42) when a left turn is made, and the motor 2A (left motor) for the left rear wheel LWr is selected (S43) when a right turn is made. However, the present invention is not necessarily limited to such control. Another example of the control flow for selecting the motor, on which driving control is to be performed, will be described with reference to FIG. 31.

First, a target yawing moment is calculated (S51). Subsequently, whether or not a direction of the target yawing moment is the same as a turning direction is detected (S52). Then, upon detection that the direction of the target yawing moment is the same as the turning direction, whether or not a left turn is made is detected (S53). Upon detection that a left turn is made, the motor 2B (right motor) for the right rear wheel RWr is selected (S55); on the other hand, upon detection that no left turn is made, i.e., upon detection that a right turn is made, the motor 2A (left motor) for the left rear wheel LWr is selected (S56). In other words, when the direction of the target yawing moment is the same as the turning direction, the motor is selected similarly to the rotational frequency adjustment motor selecting process described with reference to FIG. 25; hence, when a right turn is made, a clockwise yawing moment is generated so as to assist the vehicle in making the turn, and when a left turn is made, a counterclockwise yawing moment is generated so as to assist the vehicle in making the turn.

As described above, either one of the motors 2A and 2B, on which driving control is to be performed, is selected based on the target yawing moment so that a yawing moment is generated in the same direction as that of the target yawing moment, thus making it possible to suitably generate the yawing moment, to assist the vehicle in making a turn, and to enhance operability of the vehicle at the time of turning.

On the other hand, when it is detected in Step S52 that the direction of the target yawing moment is not the same as the turning direction, i.e., when the direction of the target yawing moment is different from the turning direction, whether or not a left turn is made is detected (S54). Upon detection that a left turn is made, the motor 2A (left motor) for the left rear wheel LWr is selected (S56); on the other hand, upon detection that no left turn is made, i.e., upon detection that a right turn is made, the motor 2B (right motor) for the right rear wheel RWr is selected (S55). The case where the direction of the target yawing moment is different from the turning direction means, for example, a case where the vehicle 3 is oversteered or a case where a serpentine motion of the vehicle 3 occurs while the vehicle 3 travels straight. In such a case, a yawing moment is generated in the direction opposite to the normal direction, thereby making it possible to correct a disturbed behavior of the vehicle 3.

Note that the present invention is not limited to the foregoing embodiments, but modifications, alterations, etc. may be made to the present invention as appropriate. For example, the ring gears 24A and 24B do not necessarily have to be provided with the hydraulic brakes 60A and 60B, respectively, but the connected ring gears 24A and 24B may be provided with at least one hydraulic brake and one one-way clutch. Further, only one of the hydraulic brake and the one-way clutch may be provided, or both of the hydraulic brake and one-way clutch may be removed.

Furthermore, although the hydraulic brake has been illustrated as the connection/disconnection means, the connection/disconnection means is not limited to the hydraulic brake. Alternatively, any means such as mechanical means or electromagnetic means may be selected as the connection/disconnection means. Moreover, the front wheel driving apparatus may use the motor as the sole driving source without using the internal combustion engine.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A vehicle driving apparatus, comprising:
   a left wheel driving device comprising:
      a first motor that drives a left wheel of a vehicle; and
      a first transmission device disposed on a power transmission path between the first motor and the left wheel;
   a right wheel driving device comprising:
      a second motor that drives a right wheel of the vehicle; and
      a second transmission device disposed on a power transmission path between the second motor and the right wheel; and
   a motor controller that controls the first and second motors,
   wherein each of the first and second transmission devices comprises first to third rotation elements,
   wherein the first motor is connected to the first rotation element of the first transmission device, and the second motor is connected to the first rotation element of the second transmission device,
   wherein the left wheel is connected to the second rotation element of the first transmission device, and the right wheel is connected to the second rotation element of the second transmission device,
   wherein the third rotation element of the first transmission device and the third rotation element of the second transmission device are connected to each other, and
   wherein when the motor controller controls the third rotation elements connected to each other such that rotations of the third rotation elements reach a targeted value, the motor controller performs driving control on either one of the first and second motors so as to control the rotations of the third rotations elements.

2. The apparatus of claim 1, wherein the motor controller selects either one of the first and second motors based on a target yawing moment, and performs the driving control on the selected motor.

3. The apparatus of claim 2, wherein the motor controller selects either one of the first and second motors such that a yawing moment is generated in the same direction as that of the target yawing moment.

4. The apparatus of claim 1, wherein the motor controller selects either one of the first an second motors which drives an outer wheel when the vehicle is turning, and performs the driving control on the selected motor.

5. The apparatus according to claim 1, further comprising:
   a brake that brakes the rotations of the third rotation elements, and
   wherein the motor controller performs the driving control on either one of the first and second motors such that a yawing moment is generated in the same direction as that of a yawing moment generated when the brake brakes the rotations of the third rotation elements.

6. The apparatus of claim 1, further comprising:
   a one-way rotation restrictor which allows the rotations of the third rotation elements in one direction and which restricts the rotations of the third rotation elements in the other direction opposite to said one direction, and
   wherein the motor controller performs the driving control on either one of the first and second motors such that a yawing moment is generated in the same direction as that of a yawing moment generated when the one-way rotation restrictor restricts the rotations of the third rotation elements.

7. A vehicle driving apparatus, comprising:
   a left wheel driving device comprising:
      a first motor that drives a left wheel of a vehicle; and
      a first transmission device disposed on a power transmission path between the first motor and the left wheel;
   a right wheel driving device comprising:
      a second motor that drives a right wheel of the vehicle; and
      a second transmission device disposed on a power transmission path between the second motor and the right wheel; and
   a motor controller that controls the first and second motors,
   wherein each of the first and second transmission devices comprises first to third rotation elements,
   wherein the first motor is connected to the first rotation element of the first transmission device, and the second motor is connected to the first rotation element of the second transmission device,
   wherein the left wheel is connected to the second rotation element of the first transmission device, and the right wheel is connected to the second rotation element of the second transmission device,
   wherein the third rotation element of the first transmission device and the third rotation element of the second transmission device are connected to each other,
   wherein when the motor controller controls the third rotation elements connected to each other such that rotations of the third rotation elements reach a targeted value, the motor controller selectively performs either one of unilateral rotational frequency control and bilateral rotational frequency control,
   wherein the motor controller performs driving control on either one of the first and second motors so as to control the rotation of said either one of the first and second motors in the unilateral rotational frequency control, and wherein the motor controller performs driving control on both of the first and second motors so as to control the rotations of said both of the first and second motors in the bilateral rotational frequency control.

8. The apparatus of claim 7,
wherein the motor controller performs the unilateral rotational frequency control when the vehicle is turning, and performs the bilateral rotational frequency control when the vehicle is moving straight.

9. The apparatus of claim 7,
wherein the motor controller performs the bilateral rotational frequency control when the vehicle is turning and longitudinal acceleration is equal to or higher than a given value, and performs the unilateral rotational frequency control when the vehicle is turning and the longitudinal acceleration is lower than the given value.

10. The apparatus of claim 7, wherein
in the unilateral rotational frequency control, the motor controller selects either one of the first and second motors based on a target yawing moment, and performs the driving control on the selected motor.

11. The apparatus of claim 10, wherein
in the unilateral rotational frequency control, the motor controller selects either one of the first and second motors such that a yawing moment is generated in the same direction as that of the target yawing moment.

12. The apparatus of claim 7, wherein
in the unilateral rotational frequency control, the motor controller selects either one of the first an second motors which drives an outer wheel when the vehicle is turning, and performs the driving control on the selected motor.

13. The apparatus of claim 7, further comprising:
a brake that brakes the rotations of the third rotation elements, and
wherein in the unilateral rotational frequency control, the motor controller performs the driving control on either one of the first and second motors such that a yawing moment is generated in the same direction as that of a yawing moment generated when the brake brakes the rotations of the third rotation elements.

14. The apparatus of claim 7, further comprising:
a one-way rotation restrictor which allows the rotations of the third rotation elements in one direction and which restricts the rotations of the third rotation elements in the other direction opposite to said one direction, and
wherein in the unilateral rotational frequency control, the motor controller performs the driving control on either one of the first and second motors such that a yawing moment is generated in the same direction as that of a yawing moment generated when the one-way rotation restrictor restricts the rotations of the third rotation elements.

15. A vehicle driving apparatus, comprising:
a left wheel driving device comprising:
  a first motor that drives a left wheel of a vehicle; and
  a first transmission device disposed on a power transmission path between the first motor and the left wheel;
a right wheel driving device comprising:
  a second motor that drives a right wheel of the vehicle; and
  a second transmission device disposed on a power transmission path between the second motor and the right wheel; and
a motor controller that controls the first and second motors,
wherein each of the first and second transmission devices comprises first to third rotation elements,
wherein the first motor is connected to the first rotation element of the first transmission device, and the second motor is connected to the first rotation element of the second transmission device,
wherein the left wheel is connected to the second rotation element of the first transmission device, and the right wheel is connected to the second rotation element of the second transmission device,
wherein the third rotation element of the first transmission device and the third rotation element of the second transmission device are connected to each other, and
wherein the motor controller performs driving control on either one of the first and second motors so as to control a turning state amount of the vehicle.

16. The apparatus of claim 15, further comprising:
a brake that brakes the rotations of the third rotation elements, and
wherein when the brakes releases the rotations of the third rotation elements, the motor controller performs the driving control on either one of the first and second motors so as to control the turning state amount of the vehicle.

17. The apparatus according to claim 15, further comprising:
a one-way rotation restrictor which allows the rotations of the third rotation elements in one direction and which restricts the rotations of the third rotation elements in the other direction opposite to said one direction, and
wherein the motor controller performs the driving control on either one of the first and second motors so as to control the turning state amount of the vehicle, when the one-way rotation restrictor releases the rotations of the third rotation elements.

18. The apparatus of claim 15,
wherein the motor controller selects either one of the first and second motors based on a target turning state amount or a required turning state amount, and performs the driving control on the selected motor.

19. The apparatus of claim 18,
wherein the motor controller selects either one of the first and second motors such that the turning state amount of the vehicle is in the same direction as that of the target turning state amount or the required turning state amount.

20. The apparatus of claim 15, wherein a yawing moment is used as the turning state amount of the vehicle.

* * * * *